US009549624B2

(12) United States Patent
Parrillo

(10) Patent No.: US 9,549,624 B2
(45) Date of Patent: Jan. 24, 2017

(54) SYSTEMS AND METHODS FOR A FRAME HANGING DEVICE

(71) Applicant: Louis C. Parrillo, Austin, TX (US)

(72) Inventor: Louis C. Parrillo, Austin, TX (US)

(*) Notice: Subject to any disclaimer, the term of this patent is extended or adjusted under 35 U.S.C. 154(b) by 0 days.

(21) Appl. No.: 14/859,413

(22) Filed: Sep. 21, 2015

(65) Prior Publication Data
US 2016/0081496 A1 Mar. 24, 2016

Related U.S. Application Data

(60) Provisional application No. 62/071,443, filed on Sep. 24, 2014.

(51) Int. Cl.
*F16M 13/00* (2006.01)
*A47G 1/20* (2006.01)

(52) U.S. Cl.
CPC ................. *A47G 1/205* (2013.01); *A47G 1/20* (2013.01)

(58) Field of Classification Search
CPC .................................. A47G 1/205; A47G 1/20
USPC ....... 248/475.1, 476, 477, 544, 547; 33/484, 33/451, 613, 645
See application file for complete search history.

(56) References Cited

U.S. PATENT DOCUMENTS

| 6,357,716 | B1* | 3/2002 | Kratish | A47G 1/205 248/466 |
| 6,421,928 | B1* | 7/2002 | Miller | A47G 1/205 33/520 |
| 7,814,675 | B2* | 10/2010 | Venderley | A47G 1/205 33/451 |

* cited by examiner

*Primary Examiner* — Gwendolyn Baxter
(74) *Attorney, Agent, or Firm* — Pierson IP, PLLC

(57) ABSTRACT

Embodiments disclosed herein describe systems and methods for a hanging device including slides configured to align the hanging device at desired positions with the frame and on a wall. Embodiments may be configured to be aligned with a frame in both horizontal and vertical directions.

10 Claims, 25 Drawing Sheets

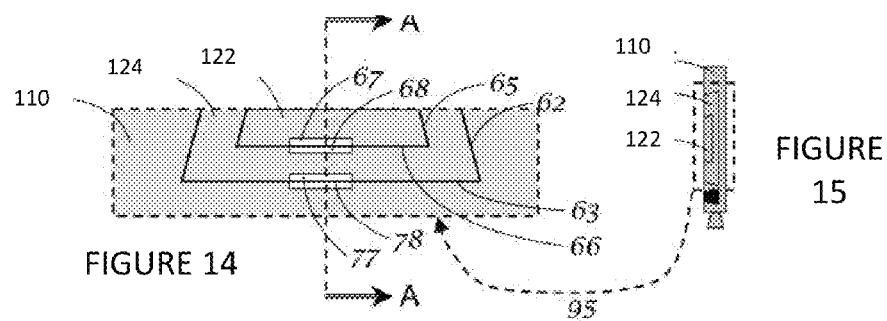
FIGURE 14
FIGURE 15
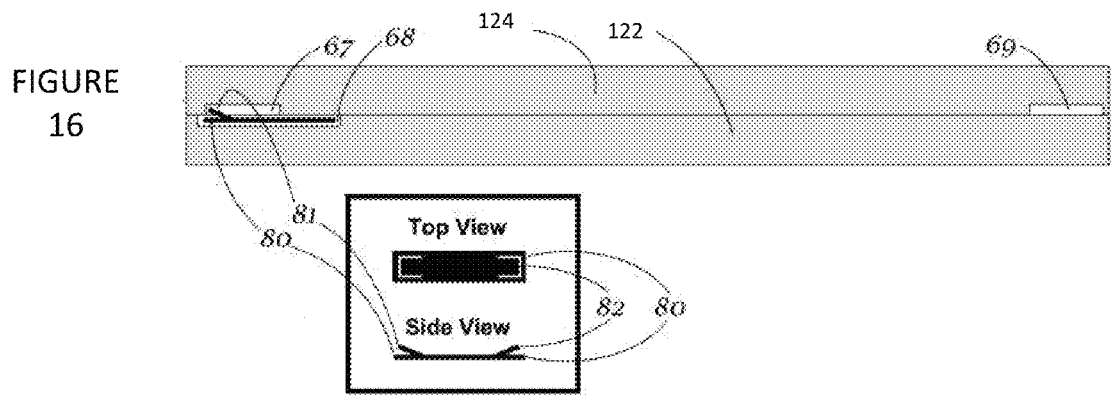
FIGURE 16
FIGURE 17

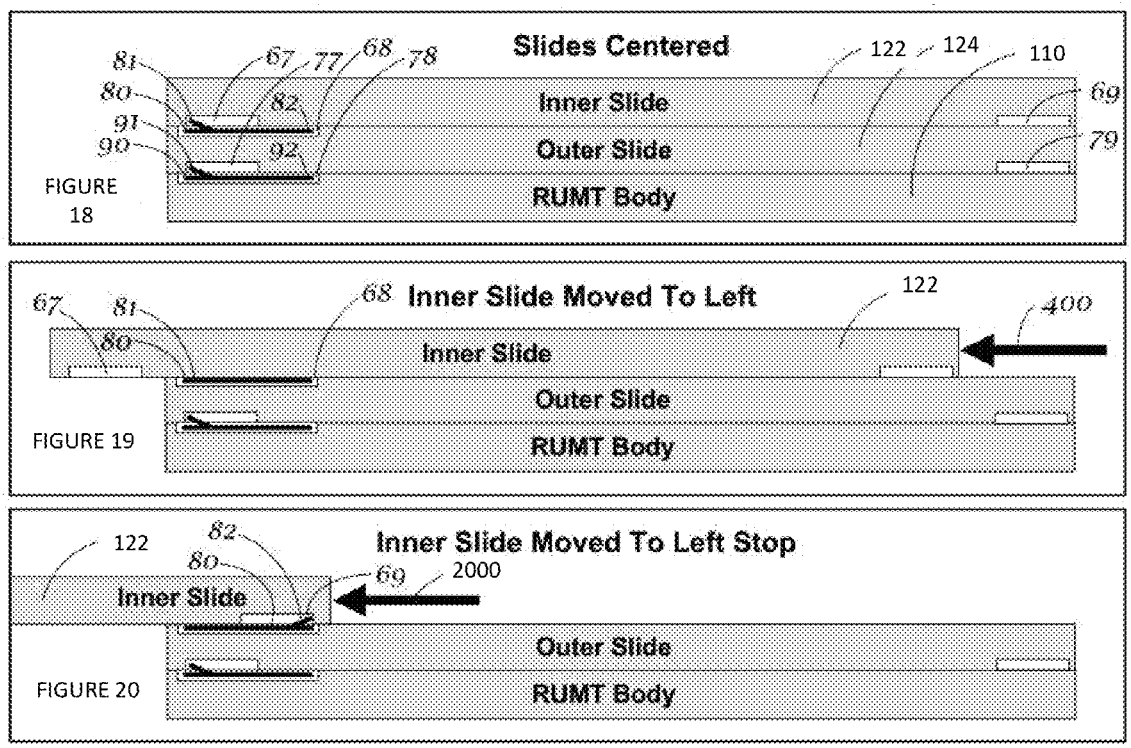

SYSTEMS AND METHODS FOR A FRAME HANGING DEVICE

CROSS-REFERENCE TO RELATED APPLICATIONS

This application claims a benefit of priority under 35 U.S.C. §119 to Provisional Application No. 62/071,443 filed on Sep. 24, 2014, which is fully incorporated herein by reference in their entirety.

BACKGROUND INFORMATION

Field of the Disclosure

Examples of the present disclosure are related to systems and methods for a device configured to be utilized to hang a device. More particularly, embodiments relate to a frame hanging device with integrated hangers, wherein the frame hanging device includes slides to align the integrated hangers for the frame at desired vertical and horizontal positions.

Background

It is extremely difficult to hang a framed picture or item at a desired position on a wall. When hanging a framed picture or item on a wall, it is an arduous task to determine the correct placement of the nails or hanging devices in relation to the frame to produce a proper orientation. As a result, hung frames typically rest askew from the desired position, are not located in a desired position, etc. Accordingly, one must reposition the nails or hanging devices and start over. This may lead to holes being positioned within the wall.

Accordingly, needs exist for more effective and efficient systems and methods for a frame hanging device including slides configured to align the integrated hangers at desired positions on a wall.

SUMMARY

Embodiments disclosed herein describe systems and methods for a frame hanging device. The frame hanging device may include slides configured to vertically and horizontally align the frame hanging device at a desired position on a wall. The hanging device may be configured to place pictures, images, frames, objects, etc. (referred to hereinafter individually and collectively as "frame") precisely where intended on a wall or support with a minimum of steps and limited measurements.

Embodiments may include a reusable measuring tool and integrated hangers. The reusable tool may include a horizontal measuring tool and a vertical measuring tool, which enable the alignment of the integrated hangers to the frame and wall. The vertical measuring tool may be configured to align the integrated hangers at a desired vertical offset on an axis, which may be based on a wire associated with the frame.

In embodiments, the integrated hangers may be configured to be removably coupled with the frame hanging device. The integrated hangers may be coupled with the frame hanging device while positioning the frame hanging device on the frame and wall. Responsive to determining a desired positioning of the integrated hangers, the integrated hangers may be secured to the wall, and the frame hanging device may linearly slide away from the integrated hangers so that the integrated hangers are decoupled from the frame hanging device and positioned at the desired location at a wall.

In embodiments, after hanging the frame with the integrated hangers on the wall, a new set of integrated hangers may be coupled with the reusable measuring tool. Accordingly, a second frame may be hung utilizing the second set of integrated hangers and the reusable measuring tool.

In embodiments, the horizontal measuring tool may include a plurality of slides, wherein the slides are configured to move in a liner direction. The scales on an inner and outer slide may be unique, and enable the horizontal self-centering of the reusable measuring tool with respect to the frame as well as the precise alignment of the frame horizontally on the wall.

In embodiments, when the outer slide is aligned with a left edge of the back of the frame, the upper scale on each slide may be utilized to determine the distance beyond the right edge of the reusable measuring tool to the right edge of the frame. The upper scales on each slide may be marked from right to left in units, such as inches. The lower scales on each slide are marked from right to left with units that are twice the size of the units on the upper half of the rule. For example, an inner slide may have an upper scale from right to left that is marked from one to twelve units. The lower scale on the outer slide may be marked from right to left with units that are separated by twice the distance as the units on the upper scale, which may be from one to six units. In other embodiments, the lower scales may be any desired multiple or fractions of the units on the upper half of the rule.

In embodiments, the scales on the outer slide may include an upper scale that is marked from right to left from 12 to 24 units, and the lower scale with scales marked from right to left from 6 to 12 units. The unique scale markings on the slides may be utilized to find the center of the dimension on the upper scale by reading the corresponding dimension on the lower scale.

For example, a first side of an outer slide may be aligned with the left side of the back of the frame and a second side of an inner slide may be extended within the outer slide to align with the right edge of the frame. The right edge of the frame may be 3 units from the second edge of outer slide, which may be indicated on the upper scale of the extended inner slide. The exact distance to the center of the space from the second edge of the outer slide to the second edge of the picture may be indicated on the lower scale on inner slide, which may be 1.5 inches. This measuring on the outer slide may be half of the units on the upper scale inner slide and is displayed on the scale making it unnecessary to perform calculations.

Next, the inner slide may be slid back into the outer slide until the dimension on the upper scale on the inner slide matches the original measuring on the lower scale of the inner slide, namely 1.5 inches. In embodiments, the outer slide may be precisely centered within the width of the frame by aligning the edge of the inner slide with the right edge of the frame. Thus, embodiments can be precisely centered horizontally with respect to the back of the frame using this process with no external measurements.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 14 depicts a front-right side view of a reusable measuring tool, according an embodiment.

FIG. 15 depicts a reusable measuring tool, according an embodiment.

FIG. 16 depicts a front-right side view of a reusable measuring tool, according an embodiment.

FIG. 17 depicts a reusable measuring tool, according an embodiment.

FIG. 18 depicts functions of the slide stops, according an embodiment.

FIG. 19 depicts functions of the slide stops, according an embodiment.

FIG. 20 depicts functions of the slide stops, according an embodiment.

Figure 1:
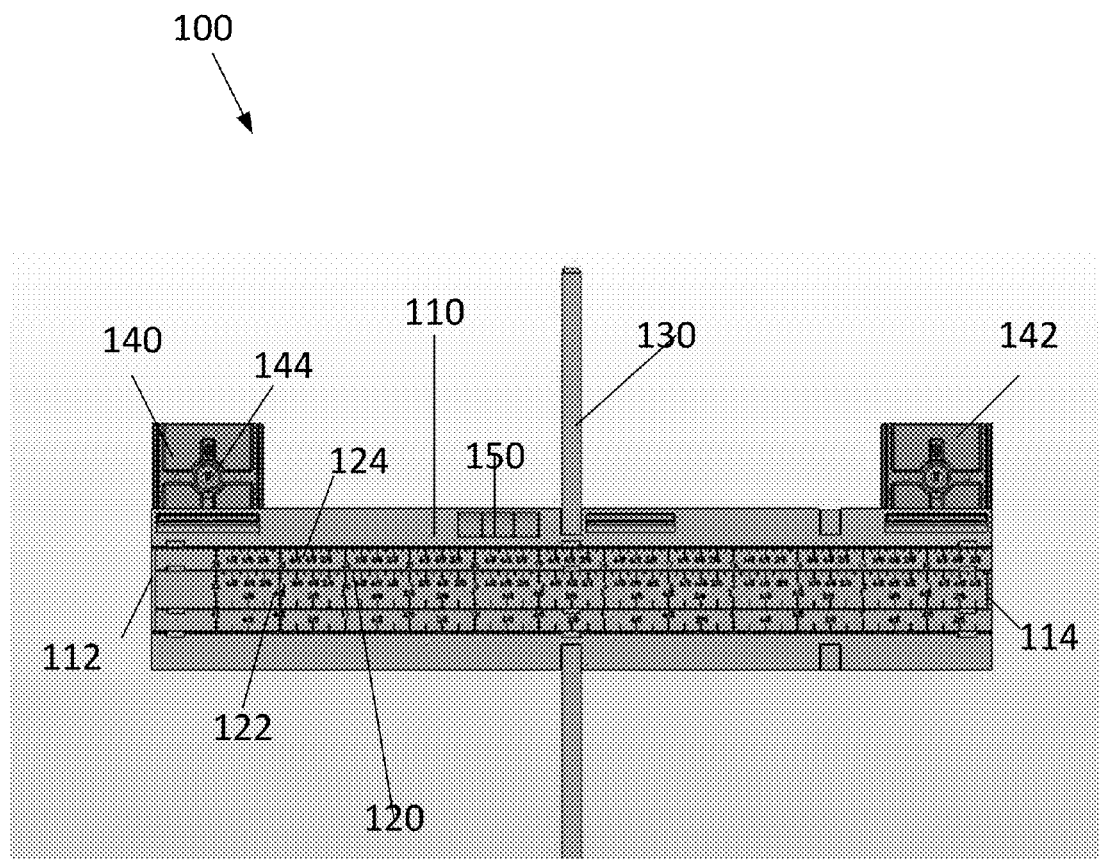
FIG. 1 depicts a frame hanging device, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a hanging device including slides configured to align the hanging device at desired positions with the frame and on a wall. Embodiments may be configured to be aligned with a frame in both horizontal and vertical directions.

Turning now to FIG. 1, FIG. 1 depicts a frame hanging device 100, according to an embodiment. Frame hanging device 100 may include a reusable measuring tool 110, a horizontal measuring tool 120, a vertical measuring tool 130, a first integrated hanger 140, a second integrated hanger 142, and a level 150.

Reusable measuring tool 110 may be a housing, base, device, etc. that is configured to couple with and house the other elements of frame hanging device 100. Reusable measuring tool 110 may be configured to temporality couple with first integrated hanger 140 and second integrated hanger 142 before first integrated hanger 140 and second integrated hanger 142 are coupled with a wall and a frame.

Horizontal measuring tool 120 may be a device that is configured to determine a center of the horizontal axis of the frame, such that first integrated hanger 140 and second integrated hanger 142 are a first given distance and a second distance from the center of the horizontal axis of the frame. Horizontal measuring tool 120 may include inner slide 122 and slide 124, wherein the first distance and the second distance may be the same distance or different distances.

Inner slide 122 and outer slide 124 may be slides, rulers, etc. that are configured to slide out and extend away from a second side 114 of reusable measuring tool 110, and slide into a second side 114 of reusable measuring tool 110. Outer slide 124 may be configured to slide within reusable measuring tool 110, and inner slide 122 may be configured to slide within outer slide 124. Alone, inner slide 122 may be configured for horizontal alignment of frames having a length below a certain threshold, for example twenty four inches. For wider frames, inner slide 122 may be configured to be extended within outer slide 124, and outer slide 124 may also be extended. In embodiments, locking mechanisms may be utilized to allow inner slide 122 and/or outer slide 124 to move or be locked in place. For example, responsive to locking inner slide 122 and/or outer slide 124, the slides may not be able to move. Responsive to unlocking inner slide 122 and/or outer slide 124, the slides may be able to move.

In embodiments, a first side 112 of reusable measuring tool 110 may be configured to align with a first edge or sidewall of a frame. Then, inner slide 122 may be moved such that the extended end of inner slide 122 is aligned with a second edge or sidewall of the frame. With inner slide 122 being extended, a user may determine the distance that the extended end of inner slide 122 extends away from second side 114 of reusable measuring tool 110. A mark may be made with a writing utensil on the wall surface at a location of the extended end of inner slide 122 to indicate the location of side edge of the frame on the wall. Next, the reusable measuring tool 110 may be moved to a position such that second side 114 of reusable measuring tool 110 is positioned half of the original distance that inner slide 122 moved to be aligned with the second end of the frame.

In embodiments, the scales on the inner slide 122 and outer slide 124 may be unique and they enable the horizontal self-centering of the reusable measuring tool 110 with respect to the frame as well as the precise alignment of the frame horizontally on the wall. In embodiments, when the outer slide 124 may be aligned with the left edge of the back of the frame, the upper scale on each slide may be moved to measure the distance beyond the right edge of the reusable measuring tool to the right edge of the frame. The upper scales on each slide may be marked from right to left in units, such as inches. The lower scales on each slide may be marked from right to left with units that are twice the size of the units on the upper half of the slide.

Vertical measuring tool 130 may be a device that is configured to determine a vertical offset of a desired position to place first integrated hanger 140 and second integrated hanger 142 on a wall. Vertical measuring tool 130 may be inserted into a slot, wherein the slot is a channel extending from a top surface of reusable measuring tool 110 to a bottom surface of reusable measuring 110.

In embodiments, when vertical measuring tool 130 is positioned within the slot, the sidewalls of the slot may apply pressure to the vertical measuring tool 130 to secure vertical measuring tool 130 in place. However, the pressure applied to vertical measuring tool 130 by the sidewalls may be overcome by a user vertically moving vertical measuring tool 130. Therefore, vertical measuring tool 130 may slide vertically within the slot to adjust the positioning of vertical measuring tool 130, or vertical measuring tool 130 may be slid out of the slot when not in use.

Responsive to coupling a wire associated with the frame on first integrated hanger 140 and second integrated hanger 142, vertical measuring tool 130 may be extended such that a top surface of the vertical measuring tool 130 aligns with a top edge of the frame. In embodiments, vertical measuring tool 130 may align with the top edge of the frame when the wire is taut while coupled with first integrated hanger 140 and second integrated hanger 142. A mark may be made with a writing utensil on the wall surface on the top surface of vertical measuring tool to indicate the location of the top edge of the frame on the wall.

In embodiments, a user may determine the desired position of a frame on the wall, and then align the reusable measuring tool 110 and first integrated hanger 140 and second integrated hanger 142 with the desired marks on the wall.

First integrated hanger 140 and second integrated hanger 142 may be devices that are configured to be removably coupled with reusable measuring tool 110. First integrated hanger 140 and second integrated hanger 142 may be configured to be positioned on an upper edge and/or a lower edge of reusable measuring tool 110. First integrated hanger 140 and second integrated hanger 142 may be evenly positioned apart from a vertical axis of reusable measuring tool 110, wherein reusable measuring tool 110 may include a plurality of slots to receive the integrated hangers 140, 142 for various sized frames.

In embodiments, when aligning reusable measuring tool 110, first integrated hanger 140 and second integrated hanger 142 may be coupled to reusable measuring tool. When reusable measuring tool is positioned along a linear axis of the frame at a desired vertical offset, reusable measuring tool 110 may be slid along the linear axis to decouple first integrated hanger 140 and second integrated hanger 142. First integrated hanger 140 and second integrated hanger 142 may each include an orifice 144. Orifice 144 may extend through first integrated hanger 140 or second integrated hanger 142 such that a hanging device (i.e. nail, screw, etc.) may be inserted through orifice 144. In embodiments, orifice 144 may be positioned within first integrated hanger 140 or second integrated hanger at an angle with respect to the wall, which may enable better support of frame hanging device 100 on the wall.

Level 150 may be a device that is configured to determine a level placement of reusable measuring tool 110. In embodiments, level 150 may be configured to indicate a horizontal plane, wherein level 150 may include a bubble of air inside a vial encased with liquid. Level 150 may include hashes, marks, lines, etc., wherein when the bubble of air is positioned within the hashes, reusable measuring tool 110 may be horizontal with a floor surface. In further embodiments, level 150 may include a horizontal level and a vertical level, wherein the vertical level may be configured to determine when reusable measuring tool 110 is perpendicular to the floor surface.

Figure 2:
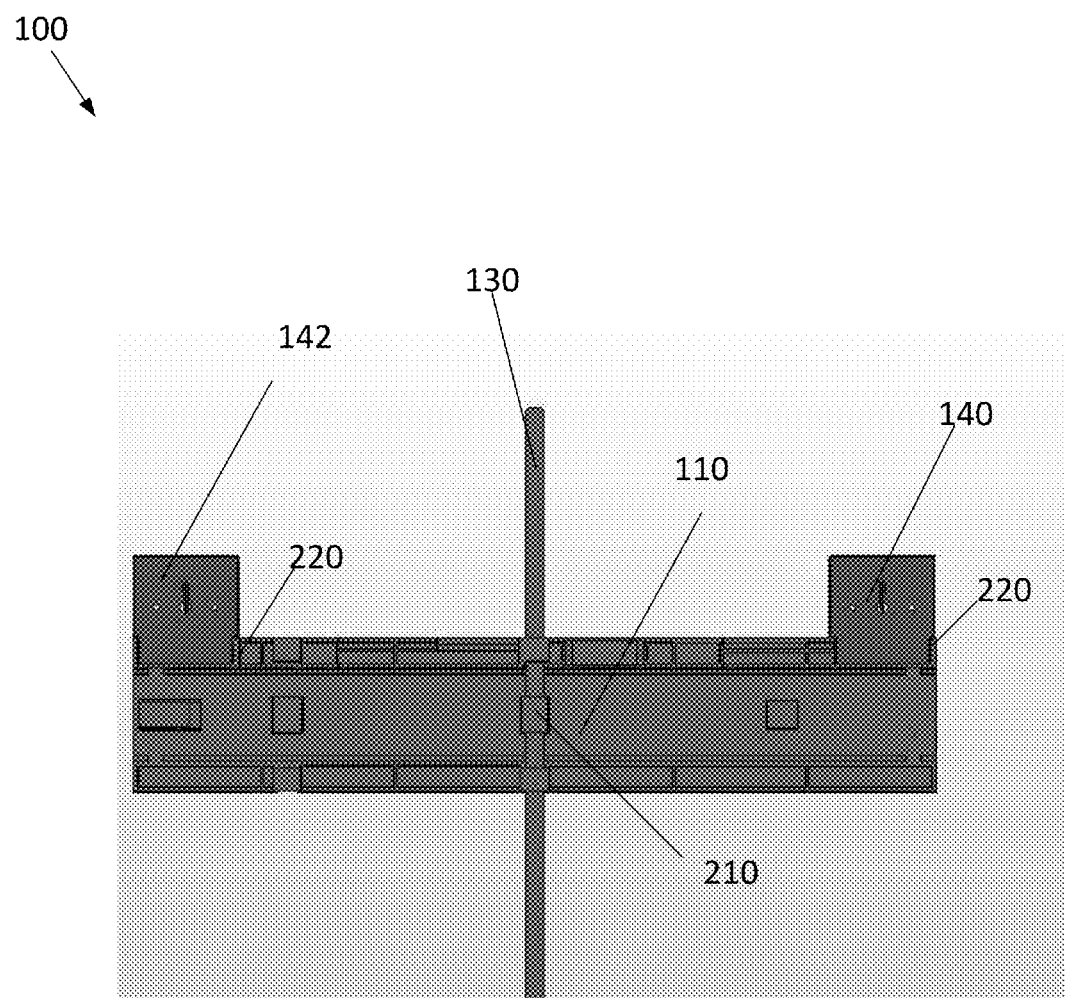
FIG. 2 depicts a rear view of a frame hanging device, according to an embodiment.

FIG. 2 depicts a rear view of frame hanging device 100, according to an embodiment. Elements depicted in FIG. 2 may be described elsewhere. Therefore, for the sake of brevity another description of these elements is omitted.

As depicted in FIG. 2, vertical measuring tool 130 may be removable coupled within reusable measuring tool 110 via channel 210. Channel 210 may be configured to apply pressure to vertical measuring tool 130, such that vertical measuring tool 130 may not slide within channel 210 unless a user applied force to vertical measuring tool 130.

Positioned adjacent to a first side of both first integrated hanger 140 and second integrated hanger 142 may be a stop 220. The stop 220 may be configured to limit, reduce, etc. the linear movement of first integrated hanger 140 and second integrated hanger 142 in a first linear direction. Furthermore, stop 220 may be utilized to limit reduce, etc. movement of reusable measuring device 110 in a second direction when first integrated hanger 140 and second integrated hanger 142 are coupled to a wall surface.

However, a stop may not be positioned on a second side of first integrated hanger 140 or second integrated hanger 142. Accordingly, first integrated hanger 140 and second integrated hanger 142 may freely move in the second linear direction. Furthermore, on the second side of first integrated hanger 140 and second integrated hanger 142 may be an opening allowing first integrated hanger 140 and second integrated hanger 142 to be inserted into or decoupled from reusable measuring tool. This may enable first integrated hanger 140 and second integrated hanger 142 to be removably coupled and decoupled with reusable measuring tool 110.

Responsive to securing first integrated hanger 140 and second integrated hanger 142 to a wall surface via a hanging device being inserted through orifices 144, reusable measuring tool 110 may be slid in the first linear direction. When reusable measuring tool 110 is slid, the force applied by nails, screws, mounts, etc. to first integrated hanger 140 and second integrated hanger 142 may secure first integrated hanger 140 and second integrated hanger 142 to a wall. The movement of reusable measuring tool 110 may align the openings with first integrated hanger 140 and second integrated hanger 142 allowing first integrated hanger 140 and second integrated hanger 142 to be decoupled from reusable measuring tool 110. However, if reusable measuring tool 110 is slid in the second linear direction when first integrated hanger 140 and second integrated hanger 142 are secured to the wall, then stops 220 may limit the movement of reusable measuring tool 110.

Accordingly, first integrated hanger 140 and second integrated hanger 142 may be configured to initially slide into reusable measuring tool 110 and align with reusable measuring tool 110 via stops 220. After the measurements are made to position first integrated hanger 140 and second integrated hanger 142, and the first integrated hanger 140 and second integrated hanger 142 are attached to the wall, first integrated hanger 140 and second integrated hanger 142 slide out of the reusable measuring tool 110 and remain attached to the wall to support a frame. In further embodiments, reusable measuring tool 110 may only include a single integrated hanger that may be positioned in the center of reusable measuring tool 110, and may be used to hang simple and/or light frames.

Figure 3:
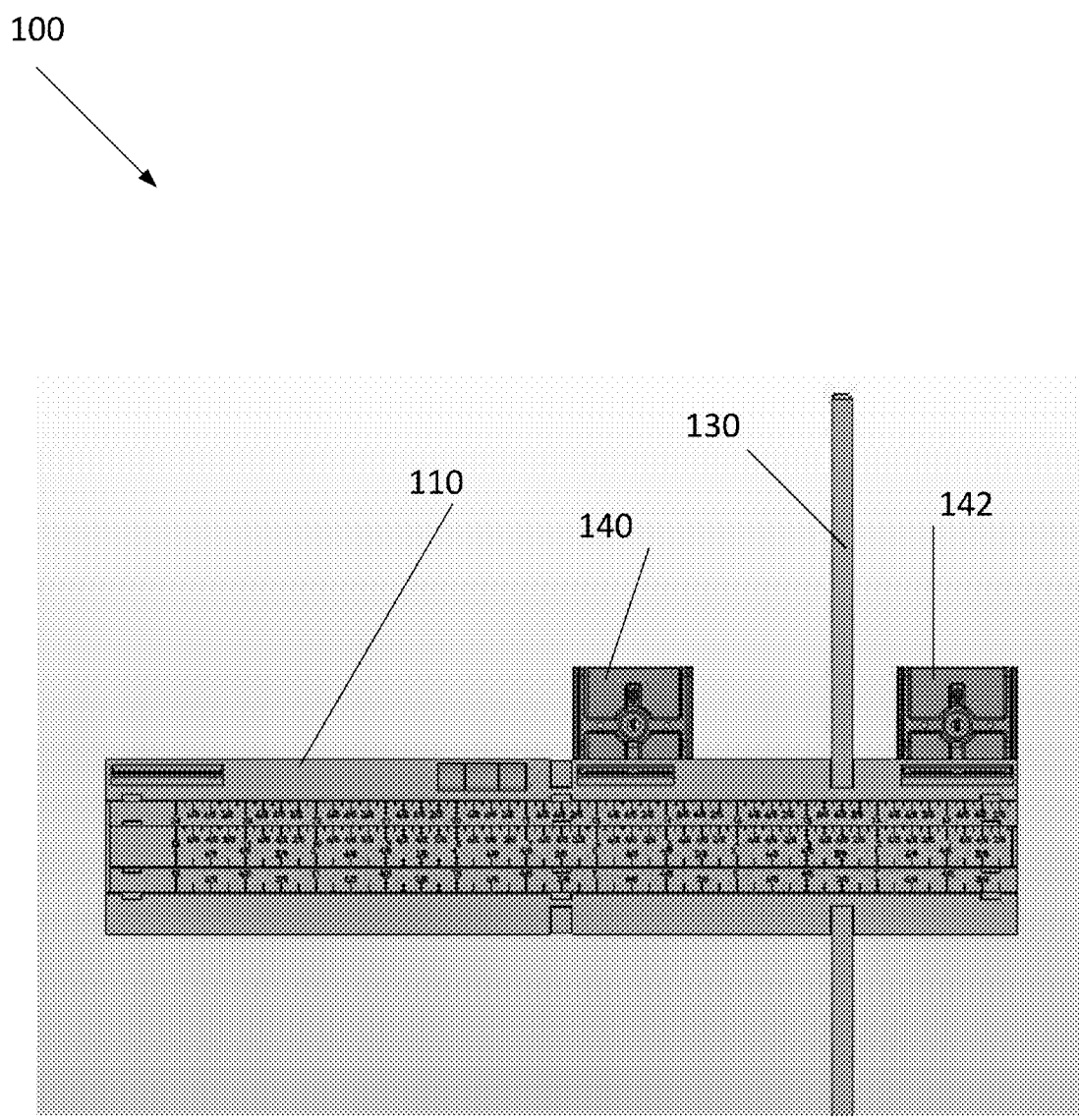
FIG. 3 depicts a front view of a frame hanging device, according to an embodiment.

FIG. 3 depicts a front view of frame hanging device 100, according to an embodiment. Elements depicted in FIG. 3 may be described elsewhere. Therefore, for the sake of brevity another description of these elements is omitted.

As depicted in FIG. 3, reusable measuring tool 110 may include different slots configured to receive vertical measuring tool 130 and first integrated hanger 140. In embodiments, the positioning of second integrated hanger 142 may remain constant, which may be adjacent to the second side of reusable measuring tool 110. Utilizing the different slots receiving vertical measuring tool 130 and first integrated hanger 140, reusable measuring tool 110 may be used to hang different sized frames.

Figure 4:
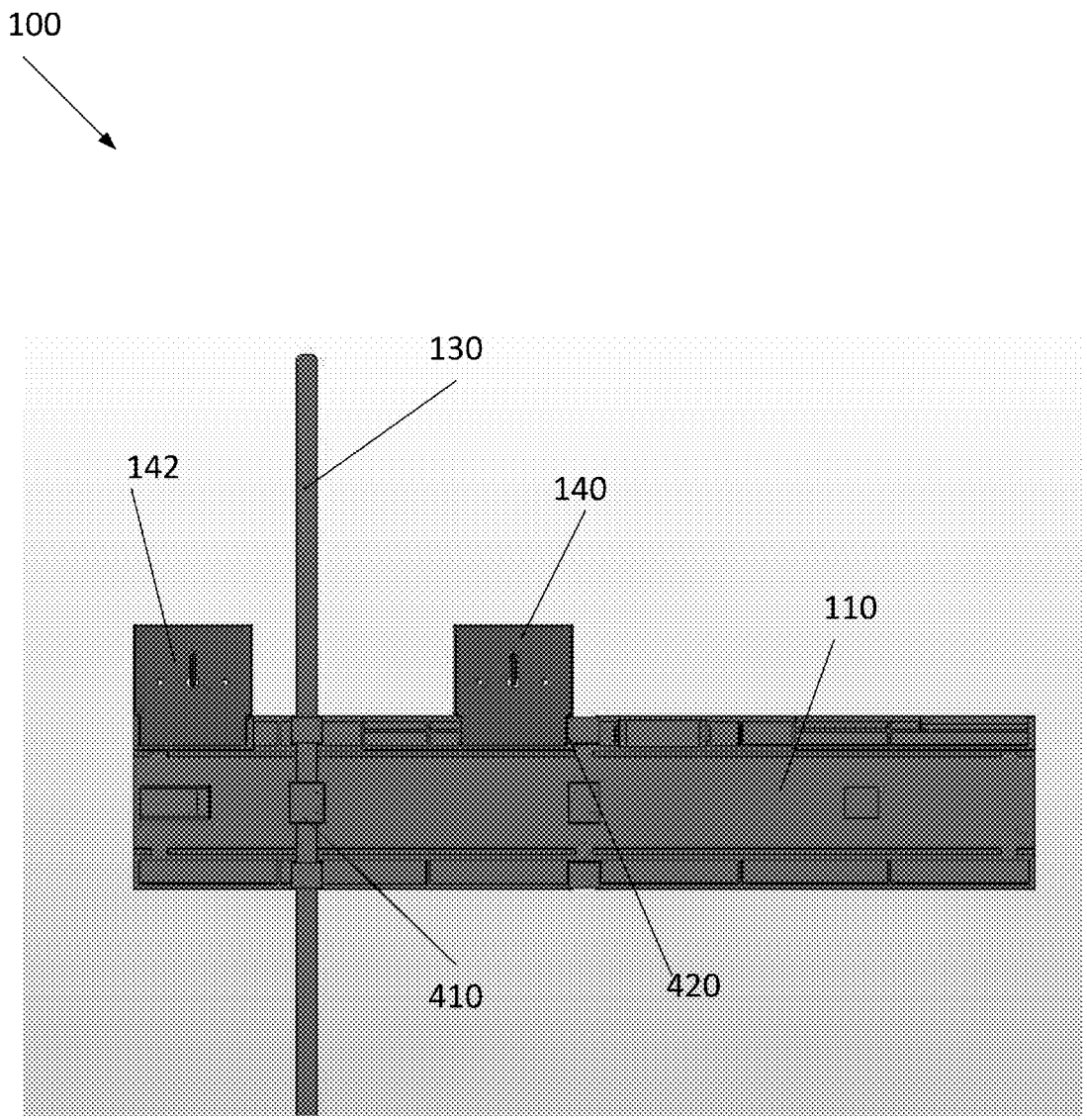
FIG. 4 depicts a back view of a frame hanging device, according to an embodiment.

FIG. 4 depicts a back view of frame hanging device 100, according to an embodiment. Elements depicted in FIG. 4 may be described elsewhere. Therefore, for the sake of brevity another description of these elements is omitted.

As depicted in FIG. 4, slot 410 may be configured to receive vertical measuring tool 130, wherein slot 410 may be more proximate to the second side of reusable measuring tool 110 than slot 210 depicted in FIG. 2.

Additionally depicted in FIG. 4, is stop 420. Stop 420 may be configured to limit the movement of first integrated hanger 140 in a first linear direction. Stop 420 may be positioned more proximate to the second side of reusable measuring tool 110 than stop 220 depicted in FIG. 2.

In embodiments, a distance between an edge of slot 410 and a proximal sidewall of first integrated hanger 140, when a distal sidewall of first integrated hanger 140 is positioned adjacent to stop 220, may be at least the length of first integrated hanger 140. Accordingly, when first integrated hanger 140 is coupled to a wall and reusable measuring tool 110 is slid in the first direction, first integrated hanger 140 may be slid out of an orifice positioned between the edge of slot 410 and the distal sidewall of first integrated hanger 140.

Figure 5:
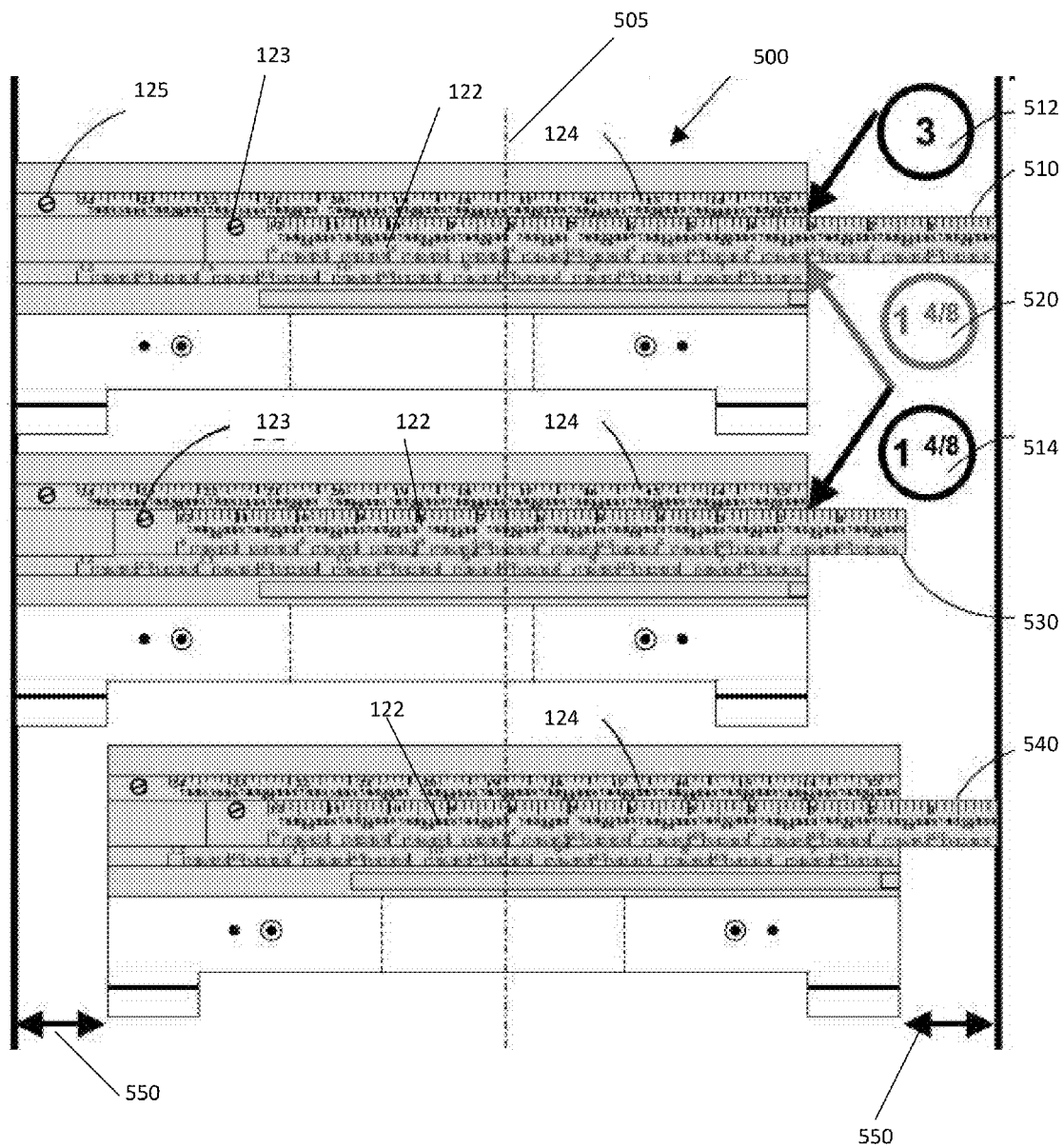
FIG. 5 depicts a method for aligning integrated hanging devices with an axis of a frame, according to an embodiment.

FIG. 5 illustrates a method 500 for aligning integrated hanging devices with an axis of a frame. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a first side of reusable measuring tool 110 may be aligned with a first edge of a frame. In embodiments, outer slide 124 may be locked in place via a locking mechanism 125. If locking mechanism 125 is rotated in a first direction then locking mechanism 125 may secure outer slide 124 in a fixed position. If locking mechanism 125 is rotated in a second direction then outer slide 124 may be able to slide in and out of reusable measuring tool 110. Locking mechanism 123 may be configured to control the linear movement of inner slide 122. If locking mechanism 123 is rotated in a first direction then locking mechanism 123 may secure inner slide 122 in a fixed position. If locking mechanism 123 is rotated in a second direction then inner slide 122 may be able to slide in and out of reusable measuring tool 110. At operation 510, locking mechanism 123 may be disengaged with inner slide 122 allowing a second end of inner slide 122 to align with a second end of the frame. As depicted at operation 510 a first distance 512 between the second end of slide 124 and the second end of inner slide 124 may be three inches. In embodiments, the first distance 512 may be a measurement depicted on an upper edge of inner slide 122. For example, first distance 512 may be three inches.

At operation 520, when the second end of inner slide 122 is aligned with the second end of the frame, a second distance 520 may be determined. The second distance may be determined based on a measurement depicted on a lower edge of inner slide 122, wherein the second distance 520 is half of the first distance. For example, the second distance 520 may be one and a half inches.

At operation 530, locking mechanism 123 may disengage with inner slide 122, which may allow inner slide 122 to linearly move. Inner slide 122 may be configured to move inward the second distance. In embodiments, inner slide 122 may be moved inward the second distance until the measurement depicted on the upper edge of inner slide 122 aligns with the second end of reusable measuring tool 110. Responsive to aligning the measurement of the second distance on the upper edge of inner slide 122 with the second end of reusable measuring tool 110, locking mechanism 123 may engage with inner slide 122 to lock inner slide in place. In embodiments, locking mechanism 123 may be locking devices that secure the slides in place unless they are pushed.

At operation 540, the second end of inner slide 122 may be aligned with the second edge of the frame. Responsive to aligning the second end of inner slide 122 with the second edge of the frame, the distance 550 between the first edge of the frame and the first side of reusable measuring tool 110 and the distance 550 between the second edge of the frame and the second side of reusable measuring tool 110 should be equal. Therefore, the center of reusable measuring tool 110 should be perfectly centered horizontally across the frame.

Figure 6:
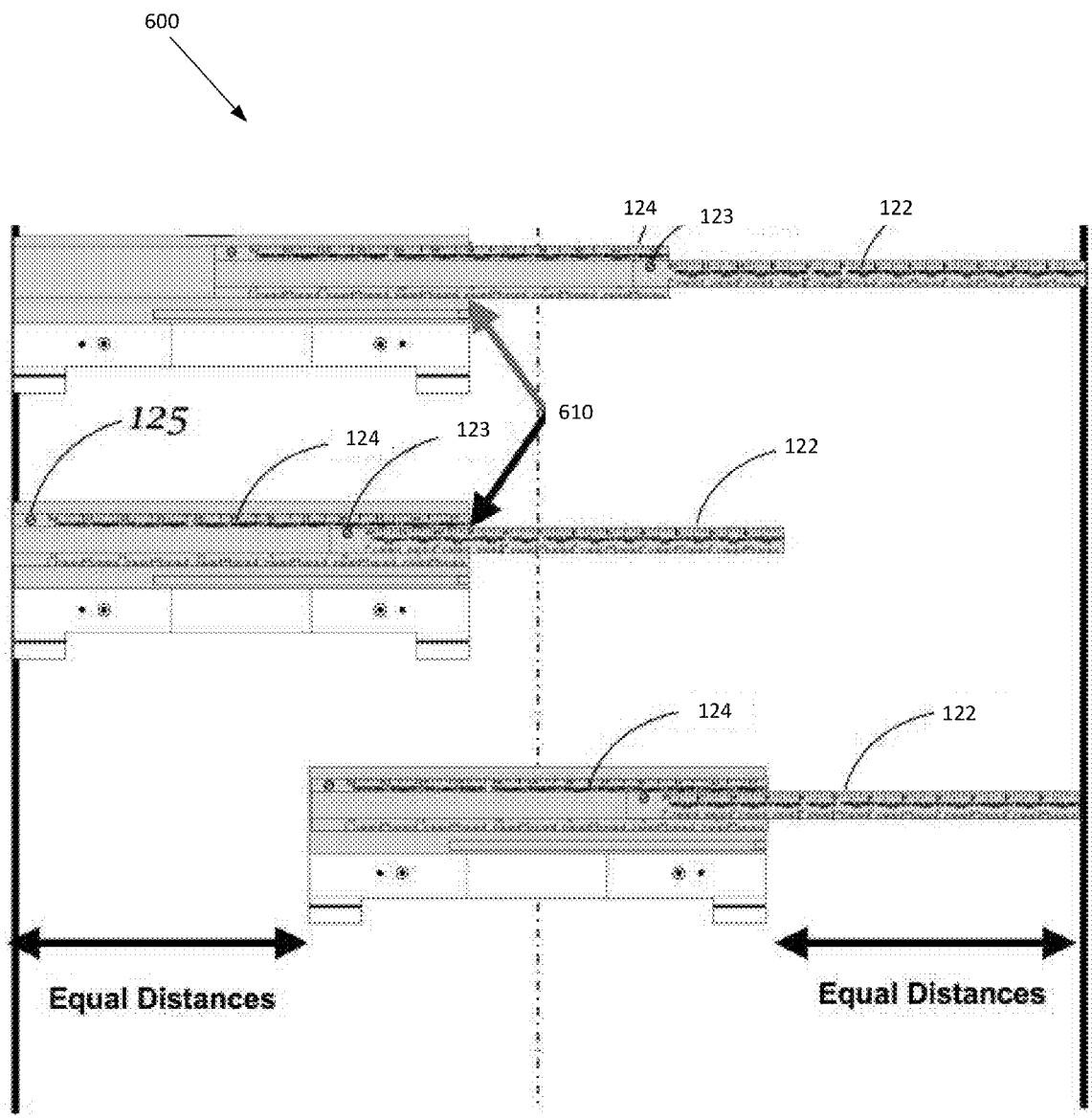
FIG. 6 depicts a method for aligning integrated hanging devices with an axis of a frame, according to an embodiment.

FIG. 6 depicts a method 600 for aligning integrated hanging devices with an axis of a frame. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

Steps depicted in FIG. 6 may be somewhat similar to those depicted in FIG. 5. However, in method 600, inner slide 122 may be fully extended, which may require outer slide 124 to extend away from the second side of reusable measuring tool 110. As depicted in FIG. 6, to have first side of reusable measuring tool 110 aligned with the first end of the frame and the second side of inner slide 122 aligned with the second end of the frame, it is required that outer slide 124 extend away from the second side of reusable measuring tool. In FIG. 6, a first distance may be measured on the upper edge of inner slide 122 and outer slide 124, and a second distance may be indicated on the lower edge of inner slide 122 and/or outer slide 124 when first end of the frame and the second side of inner slide 122 are aligned. Then, outer slide 124 and/or inner slide 122 may be retracted within reusable measuring tool until the second measurement is indicated on the upper edge of outer slide 124 and/or inner slide 122. Next, second measurement is indicated on the upper edge of outer slide 124 and/or inner slide 122, the second end of inner slide 122 may be moved to align with the second edge of the frame.

Figure 7:
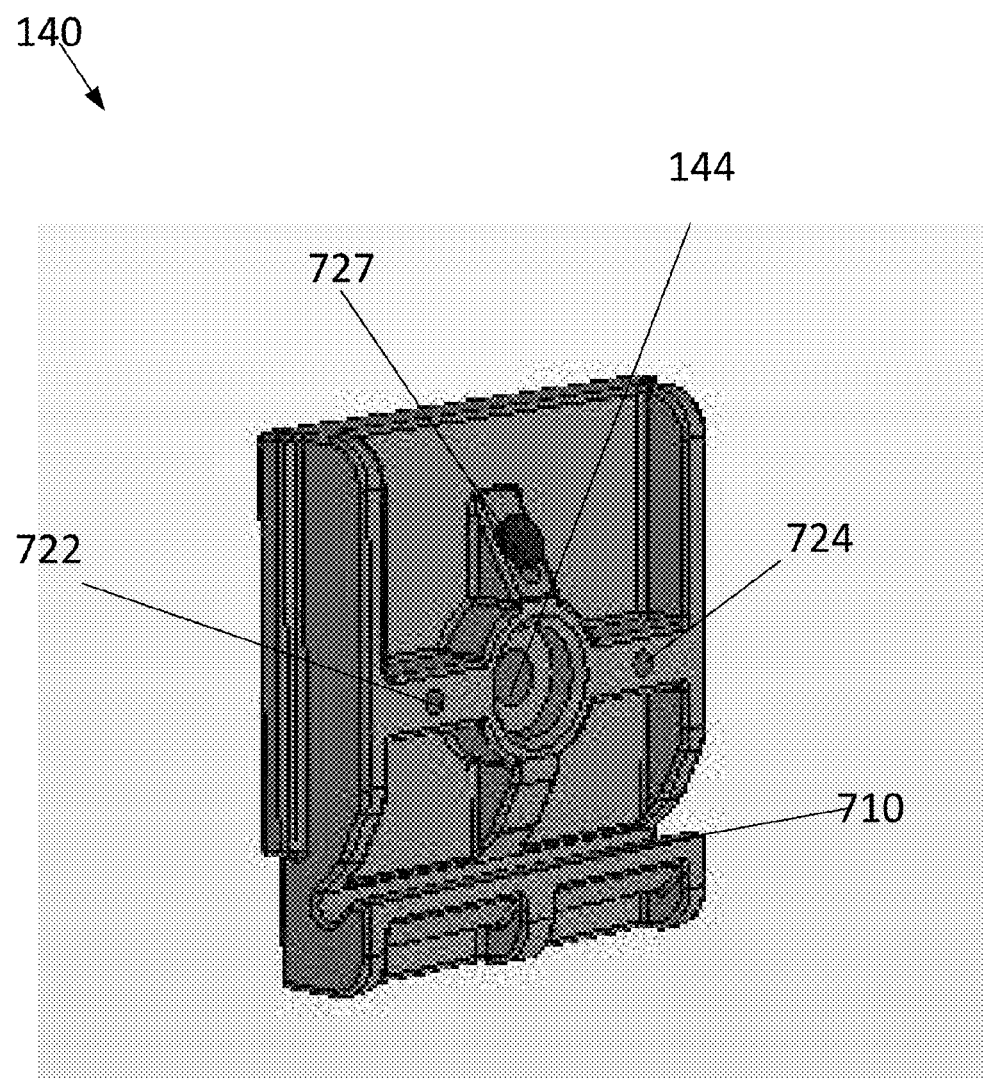
FIG. 7 depicts a first integrated hanging device, according to an embodiment.

FIG. 7 depicts one embodiment of first integrated hanging device 140. Elements depicted in FIG. 7 may be described elsewhere. Therefore, for the sake of brevity another description of these elements is omitted.

As depicted in FIG. 7, first integrated hanging device 140 may include shelf 710. Shelf 710 may be a channel, groove, slot, etc. that extends from a first side of first integrated hanging device 140 to a second side of first integrated hanging device. Shelf 710 may be configured to receive a wire of a frame, wherein when the wire is coupled to shelf 710 a desired vertical offset of reusable measuring tool 110 may be determined. When first integrated hanging device 140 is coupled with reusable measuring tool 110, shelf 710 may protrude through a slot within reusable measuring tool 110. In embodiments, the frame wire may be placed on shelf 710, and the frame wire may be taut. When the frame wire is taut, the vertical offset of the reusable measuring tool 110 may be determined.

Additionally, first integrated hanging device 140 may include a plurality of holes 722, 724, 726. Each of the plurality of holes 722, 724, 726 may have a smaller diameter than that of orifice 144, wherein orifice 144 may be configured to receive a screw while holes 722, 724, 726 may be configured to receive nails. In embodiments, holes 722 and 724 may be evenly spaced apart from orifice 144, and may extend through first integrated hanging device in a direction that is parallel to office 144. Hole 726 may be positioned above orifice 144 and may extend through first integrated hanging device 140 at an angle.

Figure 8:
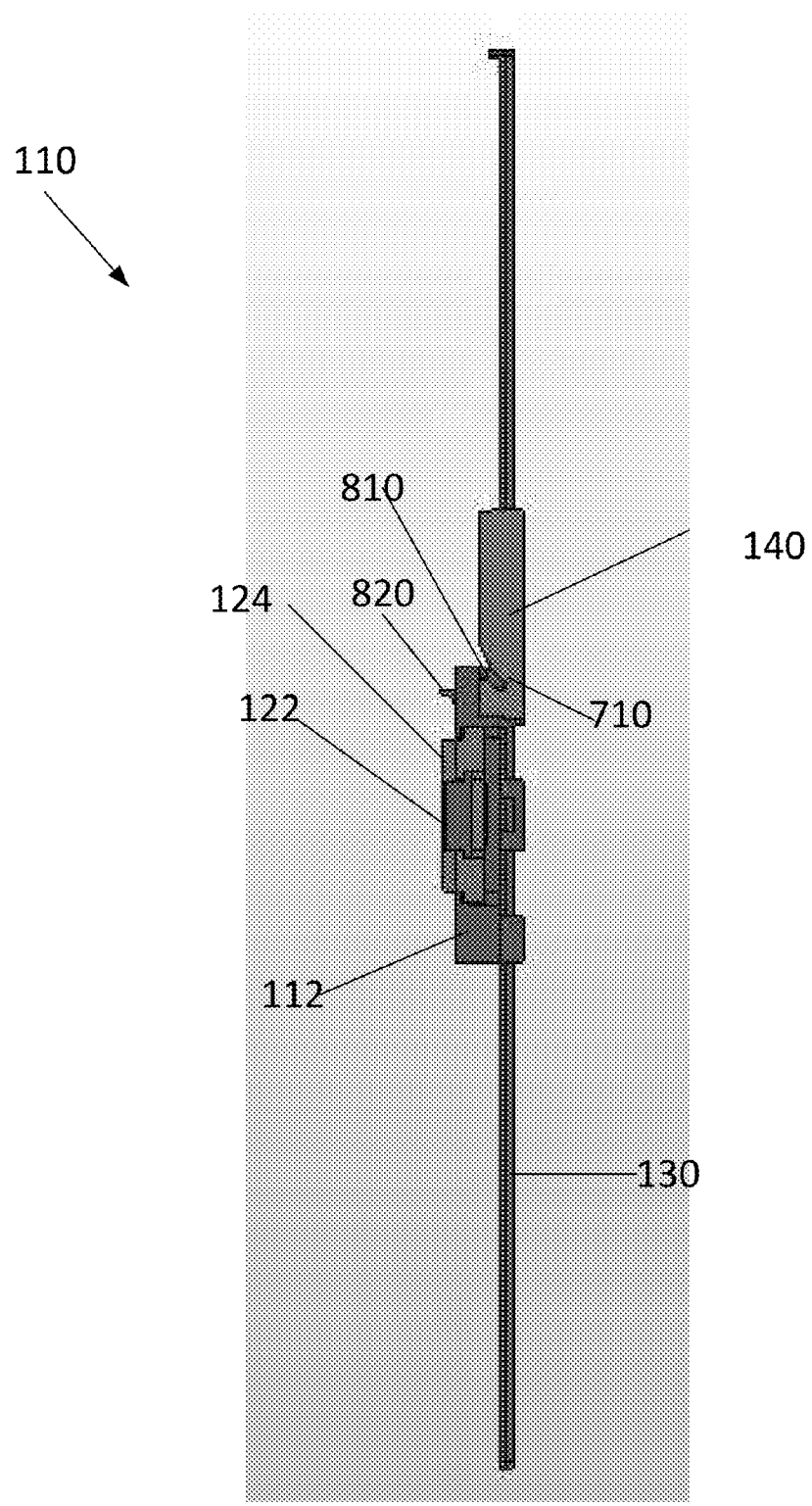
FIG. 8 depicts a side view of a reusable hanging device, according to an embodiment.

FIG. 8 depicts a side view of reusable hanging device 110, according to an embodiment. Elements depicted in FIG. 8 may be described elsewhere. Therefore, for the sake of brevity another description of these elements is omitted.

As depicted in FIG. 8, the first side 112 of reusable hanging device 110 does not include a stop. Therefore, first integrated hanging device 140 may be able to be slide into a sidewall of reusable hanging device via an opening on the sidewall. First side 112 of reusable hanging device 110 may include a notch 140 that is configured to receive shelf 710 to removably couple first integrated hanging device 140 and reusable hanging device 110. In embodiments, notch 810 may be shaped to be inserted and received by shelf 710.

First integrated hanging device 140 may also include a projection 820 positioned on a front surface of first integrated hanging device 140, wherein projection 820 is configured to simulate shelf 710 when notch 810 is inserted into shelf 710. Projection 820 may be aligned at the same vertical height as shelf 710, such that a wire may be positioned over projection 820, and be pulled taut to align a frame vertically. Projection 820 may be designed to be placed at the same vertical position as shelf 710 so that when first integrated hanging device 140 is decoupled from reusable hanging device 110. Shelf 710 may be positioned at the same vertical height as projection 820. Incorporating projection 820 on reusable hanging device 140 may simplify the design of reusable hanging device 140 and/or first integrated hanging device 140.

Figure 9:
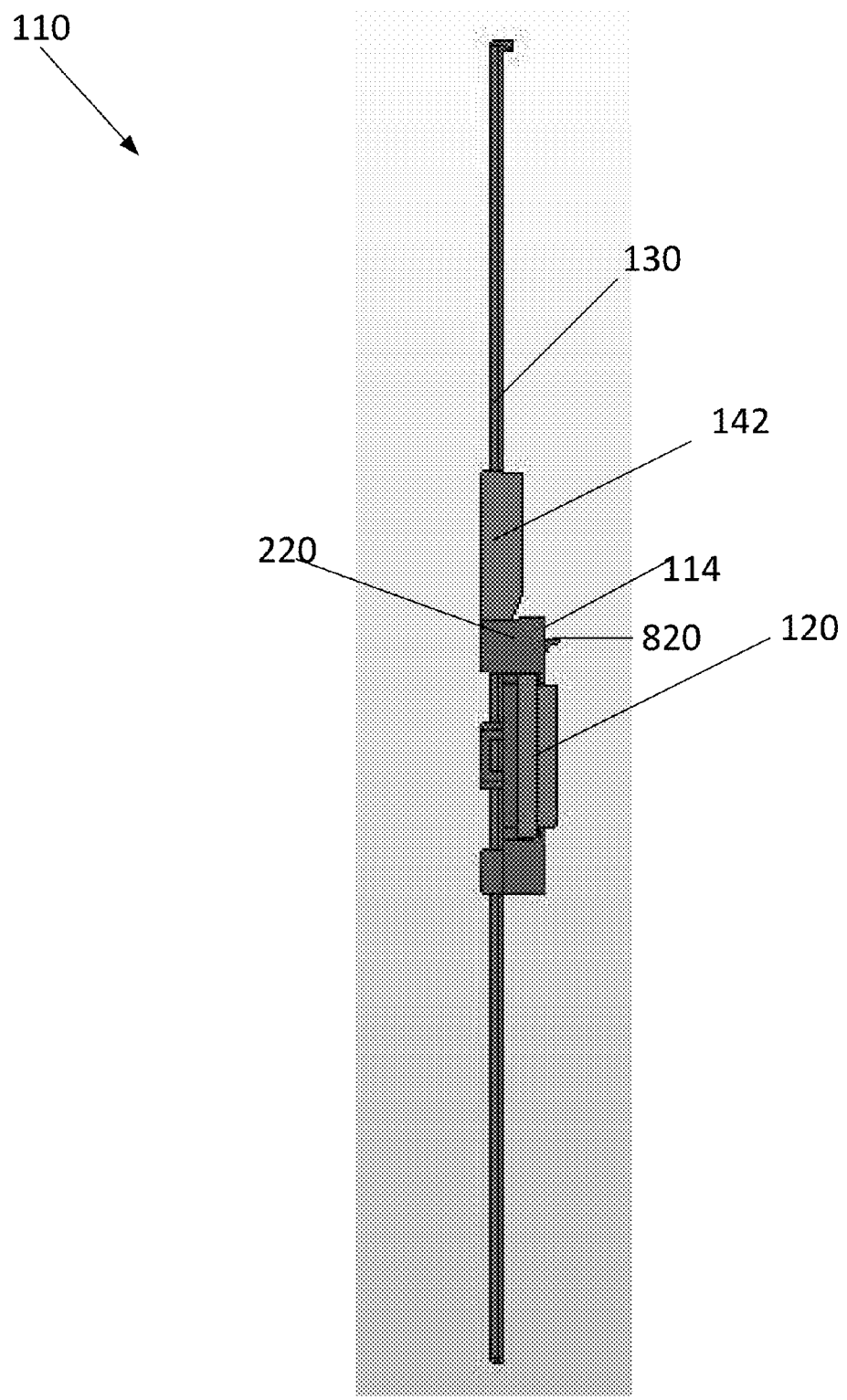
FIG. 9 depicts a second side view of a reusable hanging device, according to an embodiment.

FIG. 9 depicts a second side view of reusable hanging device 110, according to an embodiment. Elements depicted in FIG. 9 may be described elsewhere. Therefore, for the sake of brevity another description of these elements is omitted.

As depicted in FIG. 9, second side 114 of reusable hanging device 110 may include a stop 220. Stop 220 may be configured to limit the movement of second integrated hanging device 142 in a second direction. Accordingly, when a sidewall of second integrated hanging device 142 is positioned adjacent to stop 220, then second integrated hanging device 140 may no longer be able to move in the second linear direction within reusable hanging device 110. Stop 220 may be configured to cover, block, etc. a portion of second integrated hanging device 142. In embodiments, a stop 220 may be positioned on a corresponding sidewall on first integrated hanging device 140.

Figure 10:
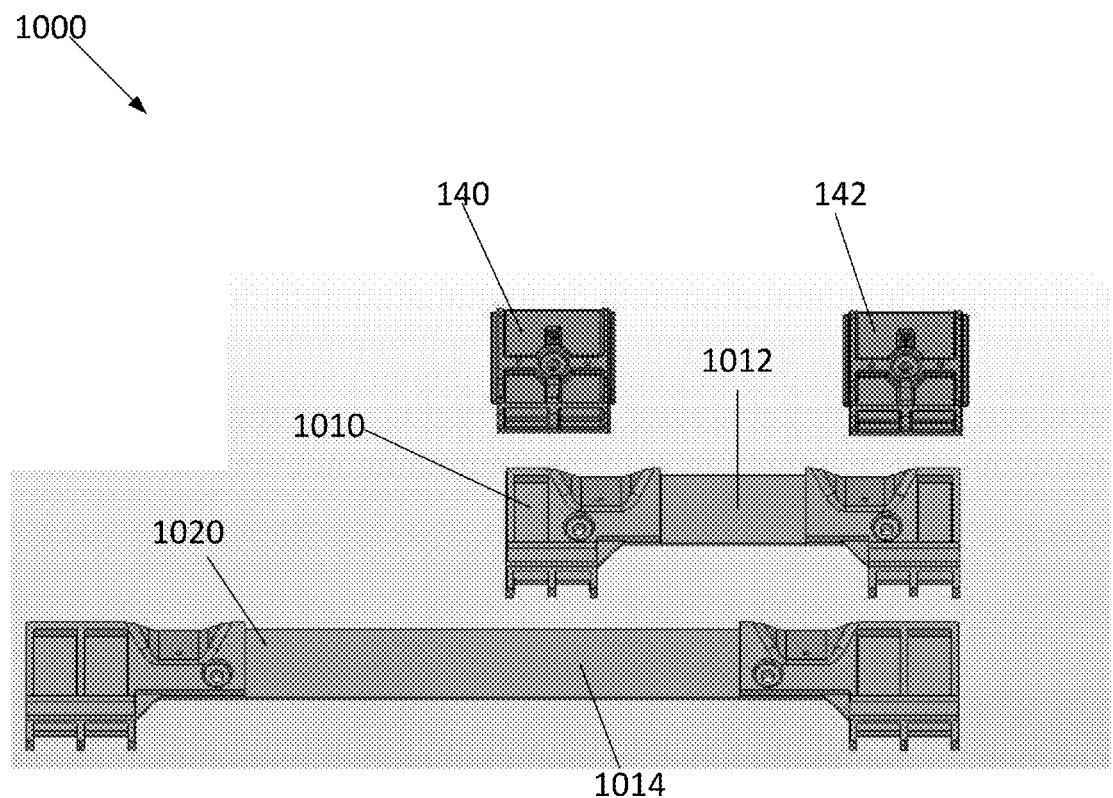
FIG. 10 depicts integrated hanging devices, according to an embodiment.

FIG. 10 depicts integrated hanging devices 1000, according to embodiments. Elements depicted in FIG. 10 may be described elsewhere. Therefore, for the sake of brevity another description of these elements is omitted. More specifically, FIG. 10 depicts first integrated hanger 140, second integrated hanger 142, short unified hanger 1010, and long unified hanger 1020.

Each of the different types of hangers 140, 1010, 1020 may be configured to be removably coupled to the same reusable hanging device 110. In embodiments, first integrated hanging device 140 and second integrated hanging device 142 may be configured to be individually inserted into reusable hanging device 110 at different times with no interconnecting shaft. Accordingly, first integrated hanging device 140 and second integrated hanging device 142 may be positioned at various, non-fixed, distances from each other.

Alternatively, a first end of short unified hanger 1010 and a second end of short unified hanger 1010 may be coupled together via shaft 1012, and a first end of long unified hanger 1020 and a second end of long unified hanger 1020 may be coupled together via shaft 1014. Based on the different lengths of shafts 1012 and 1014, different hanging devices 1000 may be used in combination with reusable hanging device 110.

In essence, first integrated hanging device 140 and second integrated hanging device 142 may be the ends of the short unified hanger 1010 or long unified hanger 1020 with built in nail and screw holes to support the frame on the wall.

Additionally as depicted in FIG. 10, when the hanging devices 1000 are attached to the wall may is easier to drape the hanger wire from the frame over the shelves in the first integrated hanging device 140 and second integrated hanging device 142 compared to draping the hanger wire over the shelves in the short unified hanger 1010 or long unified hanger 1020 since there are no restrictions for the hanger wire to the sides of the shelves in the hanging device 140 and second integrated hanging device 142 as there are in the short unified hanger 1010 or long unified hanger 1020.

Figure 11:
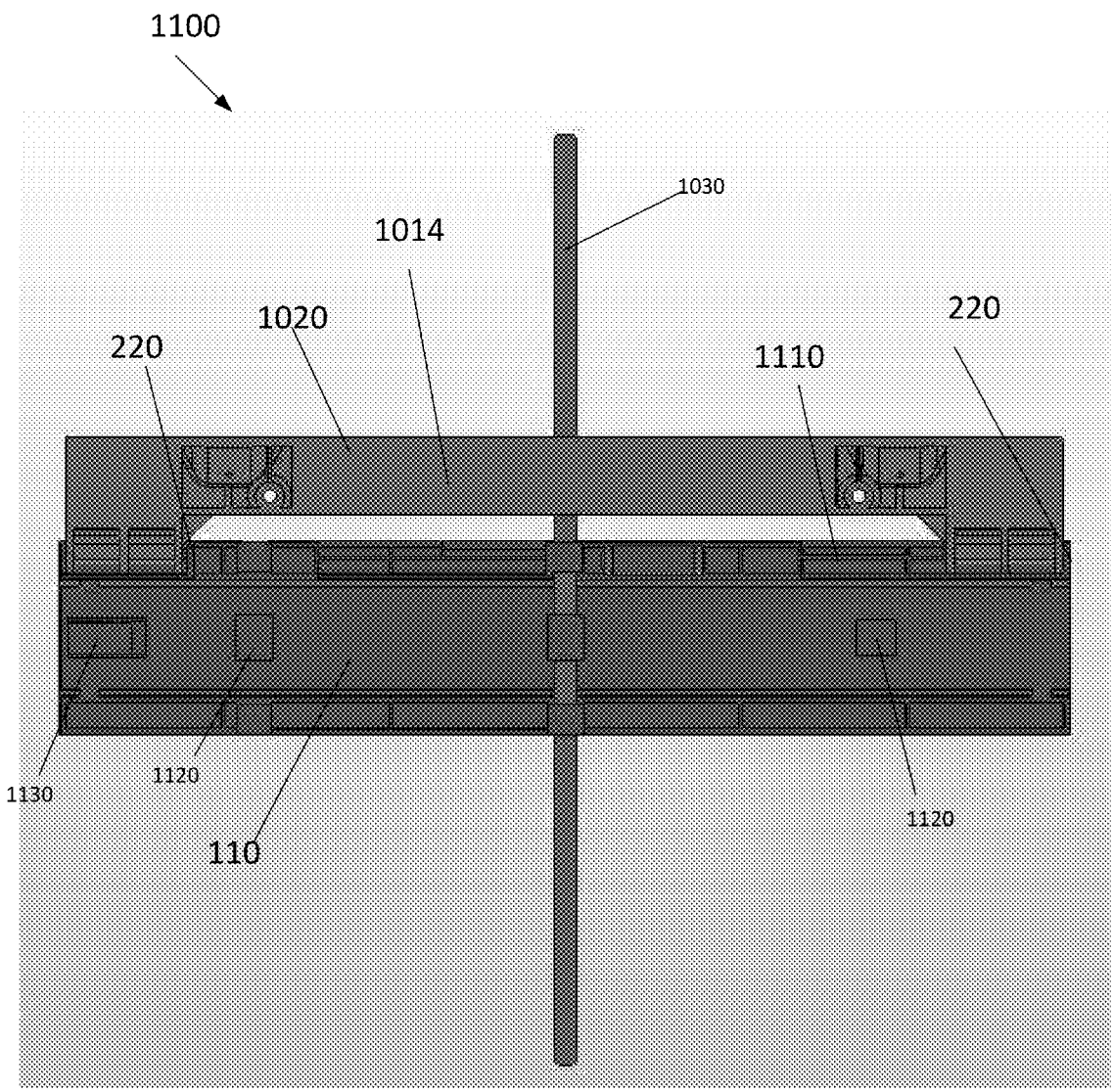
FIG. 11 depicts a long unified hanger coupled to a reusable hanging device, according an embodiment.

FIG. 11 depicts a long unified hanger 1020 coupled to reusable hanging device 110, according an embodiment. Elements depicted in FIG. 11 may be described elsewhere. Therefore, for the sake of brevity another description of these elements is omitted.

As depicted in FIG. 11, adjacent to corresponding sidewalls of long unified hanger 1020 may be corresponding stops 220. The stops may be configured to limit movement of long unified hanger 1020 in a first linear direction. In embodiments, once long unified hanger 1020 is coupled to a wall, reusable hanging device 110 may be slid in a first direction. When a hanger portion of long unified hanger 1020 aligns with slot 1110, long unified hanger 1020 may be decoupled from reusable hanging device 110. In embodiments, slot 1110 may be positioned adjacent to a second end of long unified hanger 1020 when the second end of long unified hanger 1020 is positioned adjacent to stop 220.

Furthermore, reusable hanging tool 110 may include detents 1130. Detents 1130 may be configured to allow the inner and outer slides to slide with control in the reusable hanging tool 110 to lock the slides in place. Reusable hanging tool 110 may also include holders 1120 to store the vertical measuring tool 1030 when not in use. The slots 1110 in the ends and middle part of the reusable hanging tool 110 enable connection of the long unified hanger 1020. In embodiments, long unified hanger 1020 may have a smooth back for accommodating sticky material to adhere the Hanger to the wall without nails or screws.

Figure 12:
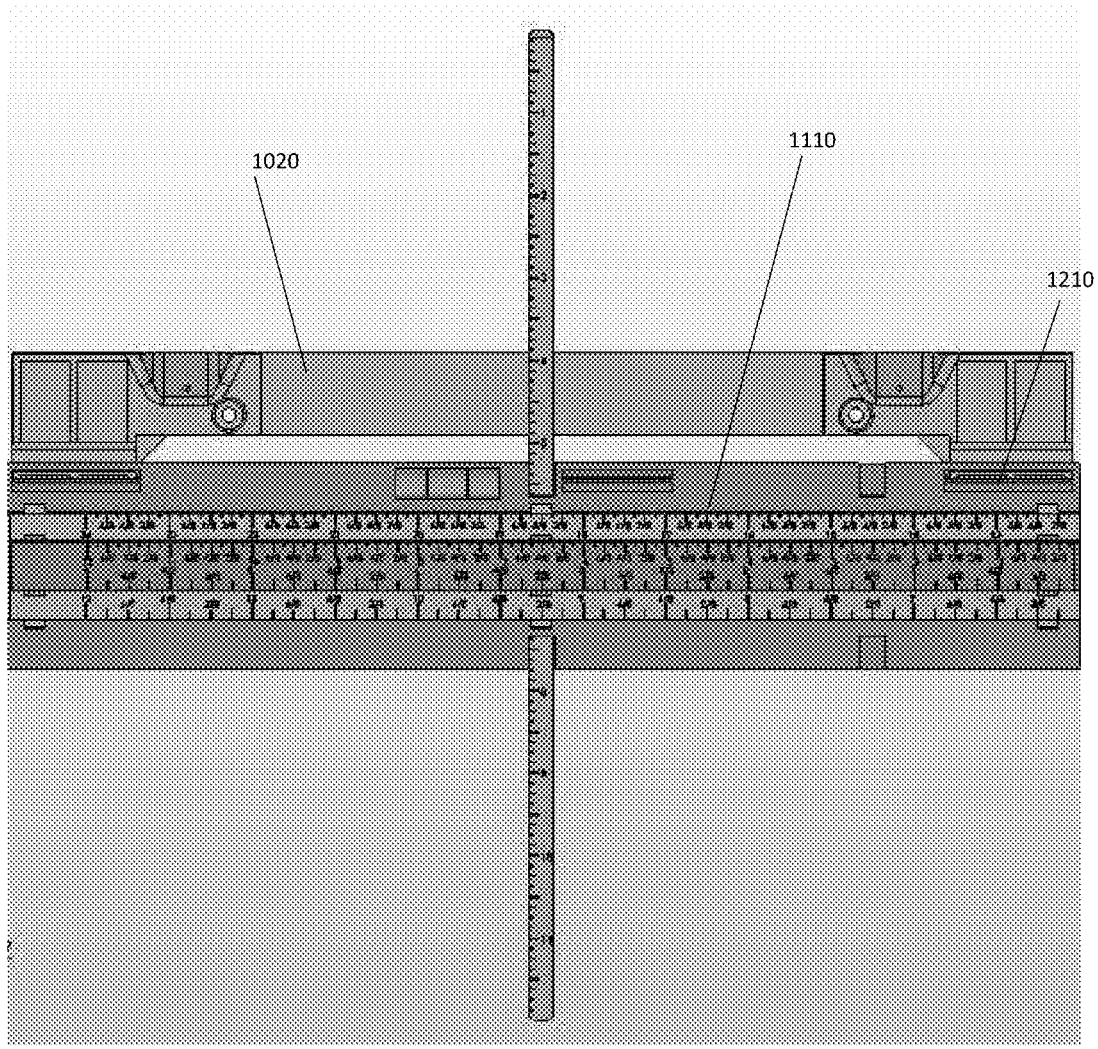
FIG. 12 depicts a long unified hanger coupled to a reusable hanging device, according an embodiment.

FIG. 12 depicts a long unified hanger 1020 coupled to reusable hanging device 110, according an embodiment. Elements depicted in FIG. 11 may be described elsewhere. Therefore, for the sake of brevity another description of these elements is omitted.

As depicted in FIG. 12, reusable hanging device 110 may include a plurality of hanger connectors 1210, which are configured to removable couple hanging devices with reusable hanging tool 110. In embodiments, the ends of the hangers may be thicker and fit into connectors 1210. The hanger may have holes to securely attach the hanger to the wall with nails at an angle as well as nail or screw holes perpendicular to the hanger.

Figure 13:
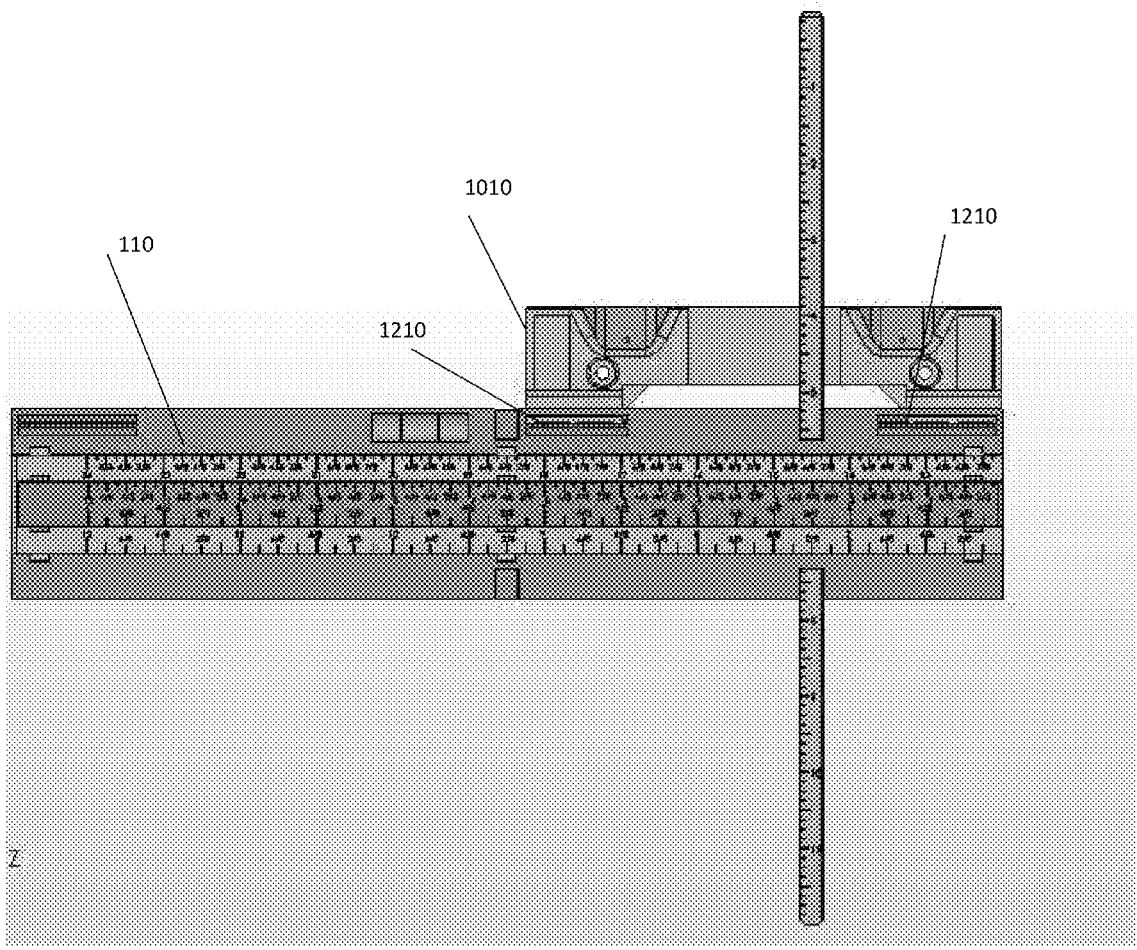
FIG. 13 depicts a short unified hanger coupled to a reusable hanging device, according an embodiment.

FIG. 13 depicts a short unified hanger 1010 coupled to reusable hanging device 110, according an embodiment. Elements depicted in FIG. 13 may be described elsewhere. Therefore, for the sake of brevity another description of these elements is omitted.

Short unified hanger 1010 may be configured to utilize uses the hanger connectors 1210 on the end and middle of the reusable hanging tool 110. The vertical measuring tool may use the vertical slots on the back of the reusable hanging tool 110 closer to the end to enable an easier vertical alignment of the hanging devices on narrower frames.

FIGS. 14-16 depicts details of mechanisms that are used to stop the slides in the reusable measuring tool 110 at their extreme leftmost or rightmost positions to contain them within the reusable measuring tool 110.

FIG. 14 depicts the front-right side view of reusable measuring tool 110. In FIG. 14 the dashed box area 95 of the front-side view is rotated clockwise to provide the horizontal front-right end view of the inner and outer slides 122, 124 in the reusable measuring tool 110. The angled side walls 65 of inner slide 130 keep it secure in outer slide 124. The bottom of inner slide 122 is surface 66. Similarly, the angled side walls 62 of outer slide 124 keep it secure in the reusable measuring tool 110. The bottom surface of 122 is 63. The thicknesses of 124, 122 and 110 are nominally ⅛ inch, ¼ inch and ⅜ inch respectively, as an example.

In FIG. 15 the end view of FIG. 14 is shown in cross section A-A along the length of the rulers. Cavities 67 and 69 at each end of the bottom surface of inner slide 122 are shown in the end view FIG. 14 and the A-A side view of FIG. 15 and will serve to stop inner slide 122 at its left-most and rightmost excursions. Cavity 68 in the top surface of the outer slide 120 is shown in the end view of FIG. 18a and the side view FIG. 15 and contains the springy stop structure 80 shown in the detail in FIG. 16. The stop structure 80 can be metal or another suitable material which is springy and able to flex repeatedly. As shown in the top and side views of FIG. 17 the stop structure 80 include of a thin rectangular or oval shaped material with cutouts 81 and 82 that can pop up when not held down. The stop structure 80 is held in cavity 68 vertically by pressing against the bottom of 124 and laterally by its snug fitting into cavity 68. In FIG. 16 the cutout 81 is shown popped up and pressing against the end of cavity 67 in 124. In FIG. 16 slide 234 cannot be slid to the right in the figure and the stop mechanism comprised of 80, 81, 67 and 68 establishes the rightmost travel of 124.

FIGS. 18-20 depict the functions of the slide stops, according an embodiment. FIG. 18-20 depict the cross sections as viewed from the top of the reusable measuring tool 110, so that movements to the left in FIGS. 18-20 represent movements along a linear path. Elements depicted in FIGS. 18-20 may be described elsewhere. Therefore, for the sake of brevity another description of these elements is omitted.

FIG. 18 depicts inner slide 122 and outer slide 124 at their furthest right positions within slide 122 and reusable measuring tool 110, respectively. FIG. 18 depicts both slides being fully withdrawn to the left into reusable measuring tool 110. Starting from the slide positions in FIG. 18, FIG. 19 depicts inner slide 122 having been moved by the force 2000 to the left. In FIG. 19, cutout 81 has been pushed below the surface of cavity 68 by the bottom surface of slide 122 which is free to continue moving to the left in the figure. As shown in FIG. 20, continuing to push slide 122 to the left with force 2000 may cause slide 122 to stop at its left-most travel in the figure because cutout 82 has popped up and presses the end of cavity 69. Thus, the stop mechanism comprising 80, 81, 82, 67, 68 and 69 may establish the extreme leftmost position of 124 in FIG. 18 and the extreme rightmost position of slide 122 in FIG. 18.

In a similar fashion, the slide stop mechanism comprised of stop structure 90, 91, 92 and cavity 78 in reusable measuring tool 110 and cavities 77 and 79 in outer slide 124 perform the same functions as just described and establish the leftmost and rightmost travel limits for outer slide 124 in reusable measuring tool 110. Of course, the same techniques can be used for more or fewer sliding rules within reusable measuring tool 110.

Figure 21:
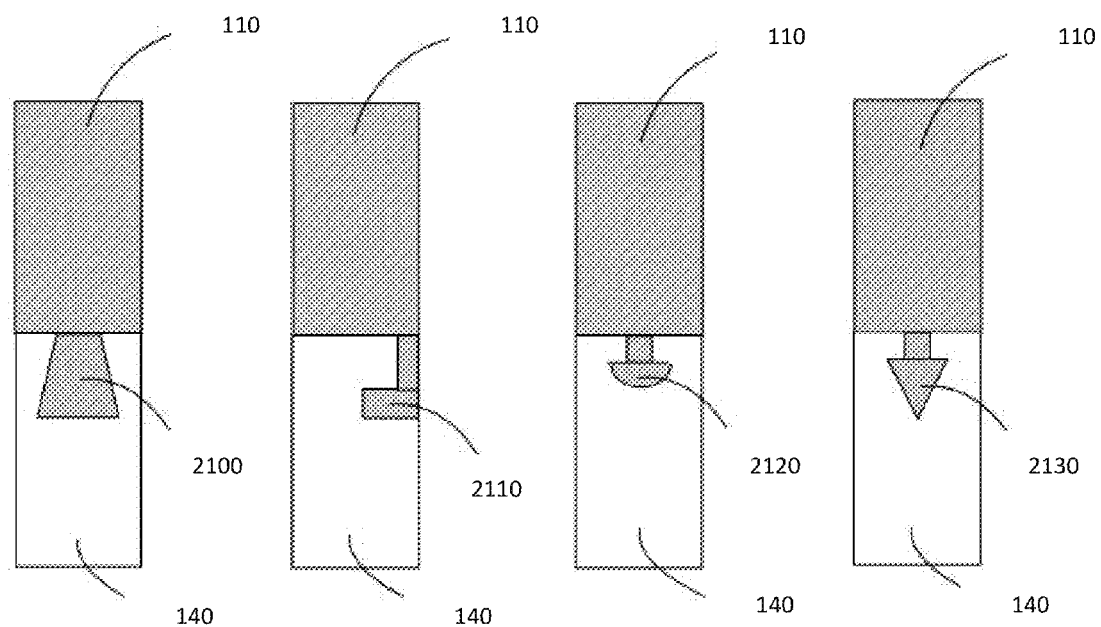
FIG. 21 depicts an end view various interfaces to couple a reusable hanging tool 100 with a hanging device, according an embodiment.

FIG. 21 depicts an end view various interfaces to couple a reusable hanging tool 100 with a hanging device 140 coupled to reusable hanging device 110, according an embodiment. Elements depicted in FIG. 21 may be described elsewhere. Therefore, for the sake of brevity another description of these elements is omitted.

As depicted in FIG. 21, reusable hanging tool 100 may have a plurality or projections 2100, 2110, 2120, 2130, wherein the plurality of projections are configured to be slide into a groove on reusable hanging device. One skilled in the art will appreciate that any desired interface may be used to couple reusable hanging tool 110 with hanging device 140.

Figure 22:
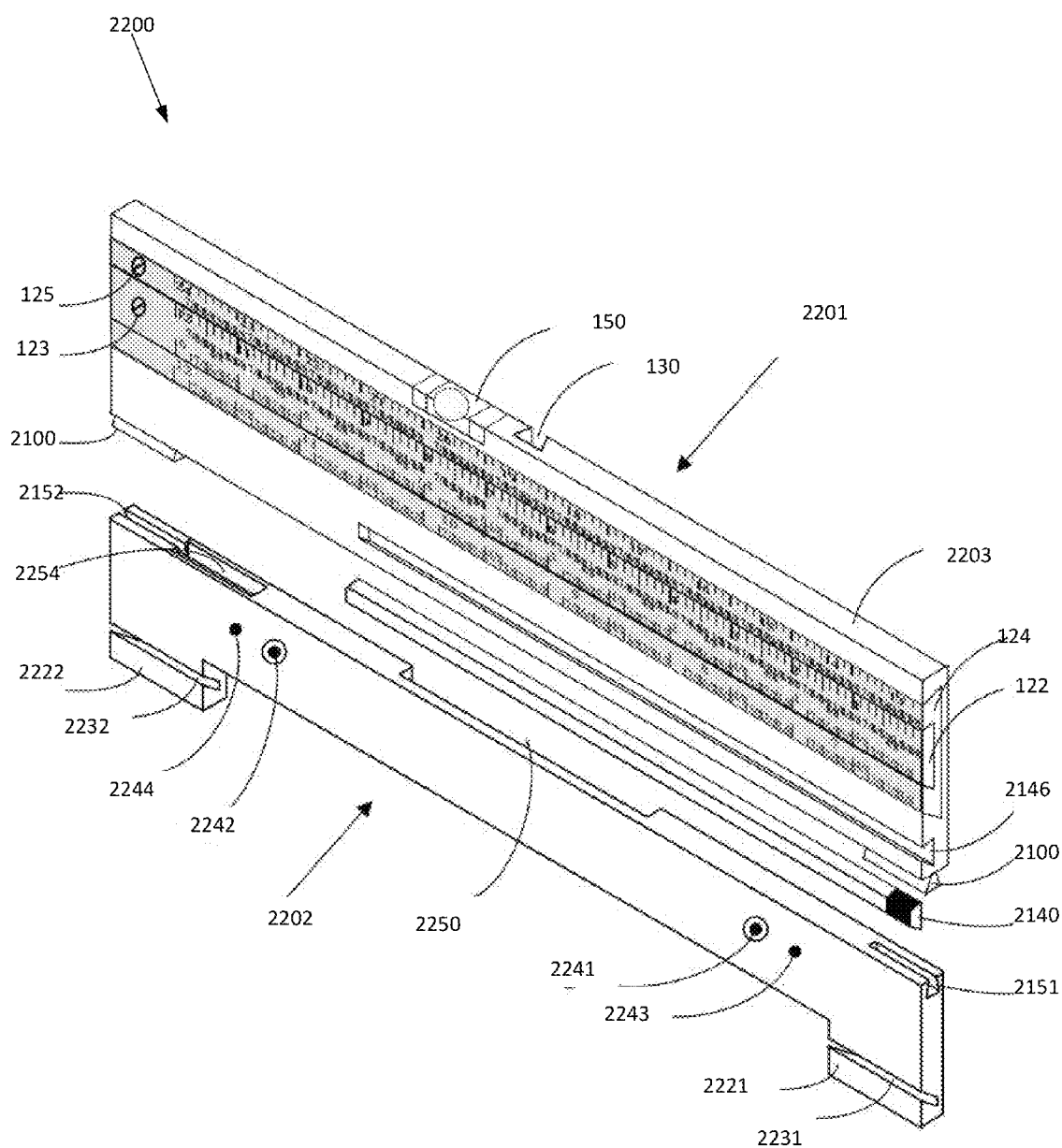
FIG. 22 depicts a frame hanging device, according to an embodiment.

FIG. 22 depicts a frame hanging device 2200, according to an embodiment. Elements depicted in FIG. 22 may be described elsewhere. Therefore, for the sake of brevity another description of these elements is omitted.

Frame hanging device 2200 may be comprised of Reusable Measuring Tool (RUMT) 2201 and a hanger 2202, which may be nominally the same thickness and length so that when joined, they appear as a unified piece. The lengths of the frame hanging device 2200 may be made in various sizes to accommodate the various widths of the variety of pictures that are to be hung. For example, the frame hanging device 2200 may be approximately 13 inches long with each of the internal rules being about 12 inches long when fully extended.

In embodiments, RUMT 2201 may couple with the hanger 2202 during the alignment and picture-hanging process. A variety of techniques can be used for the temporary connections. For example, a sliding dovetail joint may be utilized to couple RUMT 2201 and hanger 2202. The body of the RUMT 2201 may couple the hanger 2202 with the tails 2152 and 2151 that are located at the bottom of the RUMT 2201. Tails 2152 and 2151 may slide into the slots 2252 and 251 in the top of the hanger 2202. To connect the RUMT 2201 to the hanger 2202, the tail 2152 is aligned with and dropped into the non tapered slot 2254 while the tail 2151 overhangs the hanger 2202 to the right front. The RUMT 2201 is then slid to the front left so that tail 2152 slides into slot 2252 and tail 2151 slides into slot 2251. The left end of 2251 stops the further travel of RUMT 2201. By sliding the RUMT 2201 to the left front as far as it will go, the RUMT and hanger 2202 are joined as one piece.

The RUMT 2201 may include internal measuring tools that enable the alignment of the hanger 2202 to the picture and the picture to its intended place on the wall. Such tools include one or more rulers or rules that slide out from the front right side of the RUMT 2201. For example, RUMT 2201 may include two sliding rules, the inner rule 122 and the outer rule 124. Outer rule 124 slides within the RUMT 2201 and inner rule 122 slides within outer rule 124. Used alone, the inner rule 122 is for horizontal alignment on pictures whose widths are below a certain dimension, for example 24 inches. For wider pictures, the inner rule 122 is extended its full travel within the outer rule 124, and the outer rule 124 is extended up to its full travel within the RUMT 2201. So for a Picture-Hanging Device approximately 12 inches long, the hanging device 2200 can align horizontally along the width of a frame that is approximately 12 inches to approximately 36 inches in width, which is sum of the RUMT 2201 length plus the inner rule full extension length plus the outer rule full extension length. Of course, more than two rules can be embedded within the RUMT 2201 to continue to extend the horizontal dimensions. In addition, hanging device 2200 can be made to accommodate a spectrum of picture widths from quite narrow to quite wide pictures.

Locking mechanisms 123, 125 may be configured to keep rules 122 and 124 in place during the measurement and hanging process. Screw 125 can be tightened to secure outer rule 124 to the RUMT 2201, and screw 135 which be tightened to secure inner rule 122 to outer rule 124. One skilled in the art may appreciate that different locking mechanisms may be used, wherein the locking mechanisms are configured to engage with slides 122 and 124 to limit the linear movement of slides 122 and 124, and disengage with slides 122 and 124 to allow the linear movement of slide 122 and 124

The vertical self-alignment of the RUMT 2201 to the picture may use Vertical Measuring Tool (VMT) 2140, which slides vertically along the back of the RUMT 2201 in the slot 130. The VMT 2140 and slot 130 are configured to hold VMT 2140 in the slot 130 without falling out, with friction keeping VMT 2140 in place while determining measurements. The VMT 2140 can be stored in the RUMT in slot 2146 when not in use. If necessary, a locking mechanism such as screws 123 and 125 or some other mechanisms can be used to keep the VMT 2140 in place in the slots 130 and 2140.

The RUMT 2201 may also include a level 150, which may be configured to the level RUMT 2201 while the hanger 2202 is being attached to the wall. Subsequent to attaching the hanger 2202 to the wall, the RUMT 2201 may be disconnected from the hanger 2202, and the RUMT 2201 may be reused indefinitely with other hanger 2202.

The procedure for disconnecting the RUMT 2201 from the Hanger 2202 may be to slide to the front right of RUMT 2201 enough that tail 2152 is in slot 2254 to the right of slot 252 and tail 151 is to the right of slot 251 and is overhanging RUMT 2201. RUMT 2201 can then be lifted vertically away from Hanger 2202.

As depicted in FIG. 22, the RUMT 2201 can be connected to hanger 2202 with the VMT 2140 in place along the vertical slot 130 in the RUMT 2201. The VMT 2140 can extend above and below the RUMT 2201 when in slot 145. Thus, to attach or to remove the RUMT 2201 from the hanger 2202, the RUMT 2201 with the VMT extending below it must freely slide to the left or right without impediment. To enable this free movement slot 250 is cut into the back of RUMT 2201 to a depth of at least the depth of slot 145 in the RUMT 2201 back. Thus, when VMT 140 is in slot 145 and extended below RUMT 2201, VMT 140 can move freely within slot 250 as the RUMT 2201 and hanger 2202 are connected or disconnected.

Hanger 2202 may be attached to the wall and support the picture. The frame wire may be placed through the angled slots 2232 and 2231 in the vertical ends 2222 and 2221 of the Hanger respectively to support the picture. Slots 2232 and 2231 can be angled approximately 30 to 45 degrees or so from the vertical. A portion of hanger 2202 is cut out between the ends 2222 and 2221 to allow the picture hanging wire to flex and to be more easily strung over the slots 2232 and 2231. The hanger 2202 can be attached to the wall using a variety of mechanisms. In embodiments, nails can be accommodated in the nail holes 2244 and 2243 that are formed through the hanger 2202 at an angle of approximately 30 degrees down from the vertical so that the nails are pushed down and into the wall by the weight of the frame. Such an arrangement is more secure than driving nails perpendicularly to the wall. Alternatively, screws can attach the hanger 2202 to the wall and can be accommodated by screw holes 2242 and 2241 in the hanger 2202 extend perpendicularly through the hanger 2202. To ensure a flat surface of the Hanger after attaching it to the wall, the screw holes 242 and 241 can be countersunk to the front face of Hanger 2202. Nail holes 2244 and 2243 can be formed at different angles and placed at different positions relative to screw holes 2242 and 2241 in the face of Hanger 2202. Additionally more than two sets of nail and screw holes can be used to secure the hanger 2202 to the wall.

Figure 23:
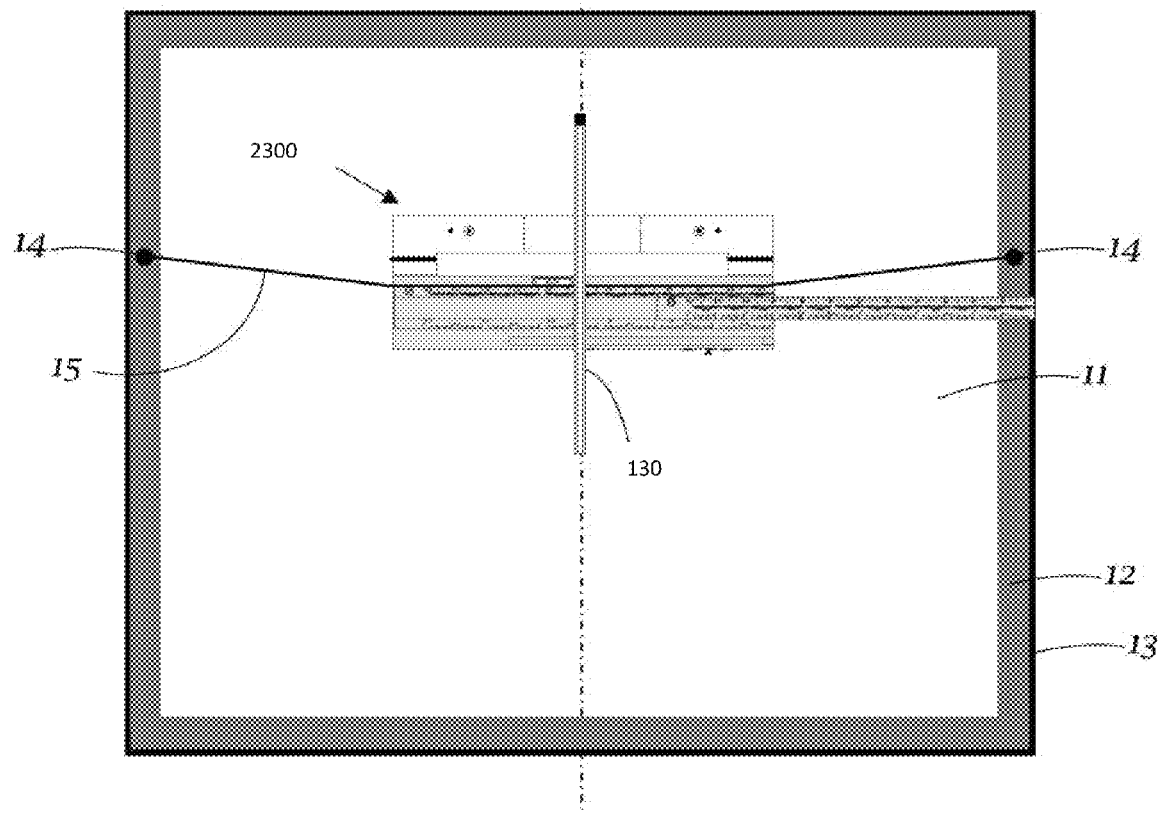
FIG. 23 depicts a RUMT/Hanger horizontally aligned with the back of a picture, according to an embodiment.

FIG. 23 depicts the RUMT/Hanger 2300 horizontally aligned with the back of the picture 11. The conventional hanger wire 15 is located on the back 13 of the picture frame 12 and is secured to the frame with attachments 14. The VMT 130 slides vertically along the back of the RUMT 2201 and extends below the RUMT/Hanger 2300. The edge of inner rule 122 may be aligned to the right side of the frame.

Figure 24:
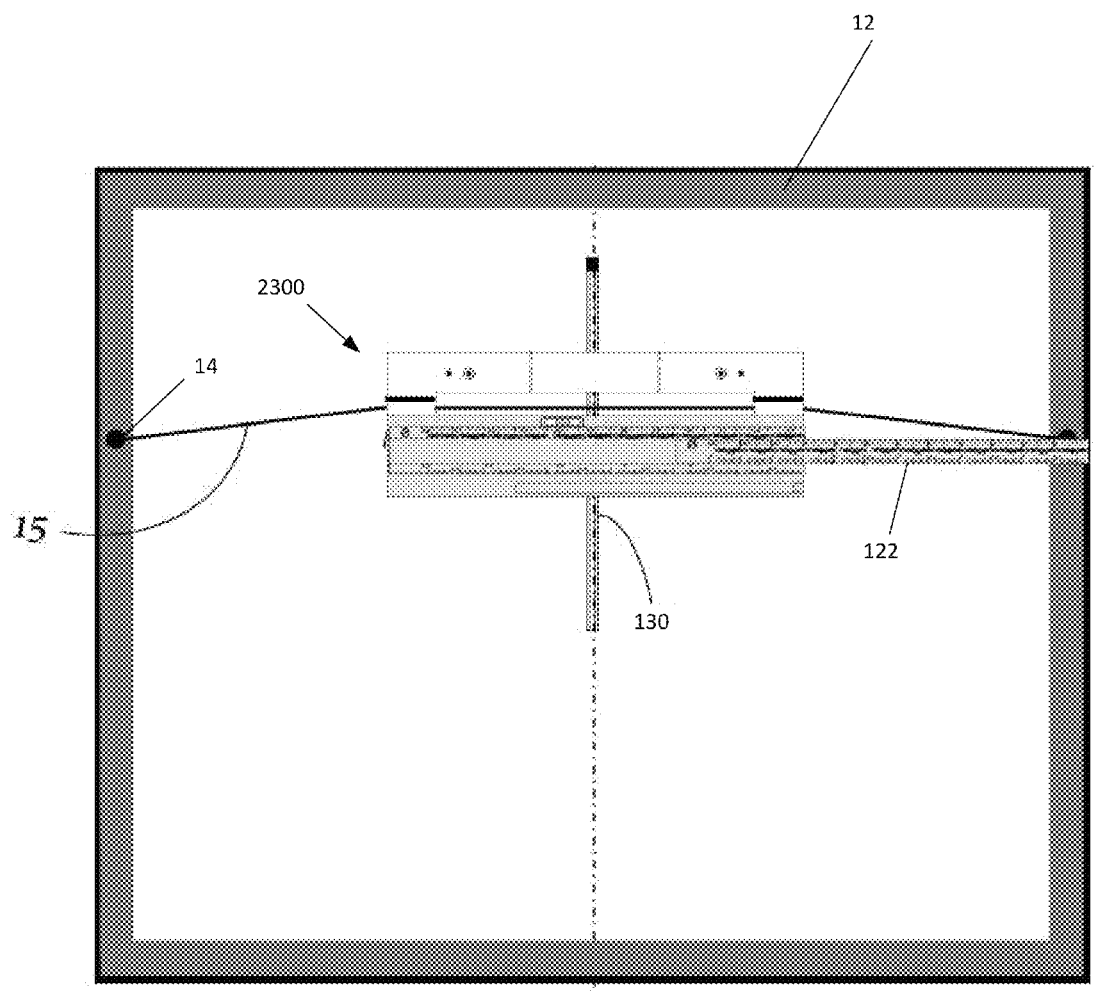
FIG. 24 depicts a RUMT/Hanger after a hanging wire has been strung over the angled slots, according to an embodiment.

FIG. 24 depicts the RUMT/Hanger 2300 after the hanging wire 15 has been strung over the angled slots 2232 and 2231 and the RUMT/Hanger 2300 is lifted to provide tension in wire 15.

Figure 25:
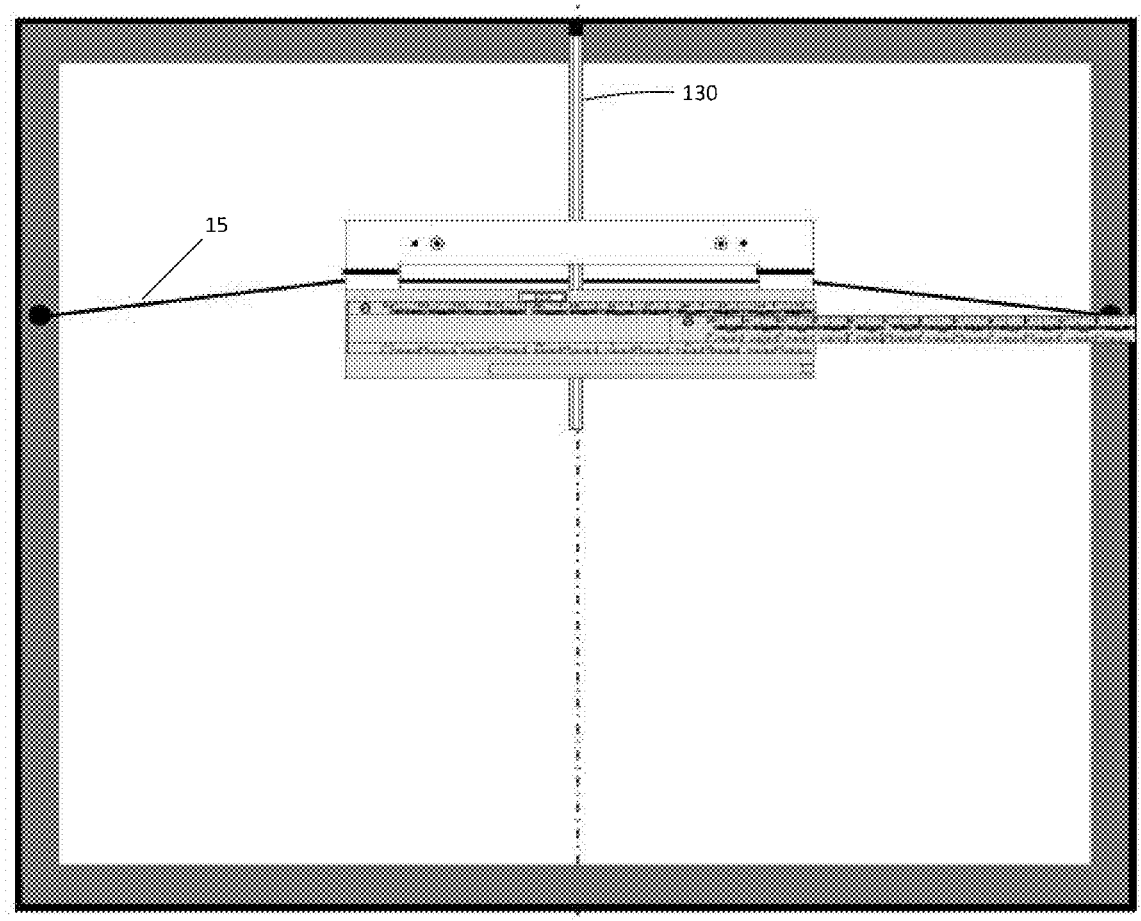
FIG. 25 depicts a RUMT/Hanger after a VMT is pushed up to align with the top of a picture, according to an embodiment.

FIG. 25 depicts the RUMT/Hanger 2300 after the VMT 120 is pushed up to align with the top of the picture thus aligning the RUMT/Hanger 2300 vertically as well as horizontally with respect to the back of the picture. When wire 15 is taut, marks may be positioned on a wall surface at the distal ends of VMT 130 and inner rule 122. These marks may be utilized to align RUMT/Hanger 2300 on a wall.

Figure 26:
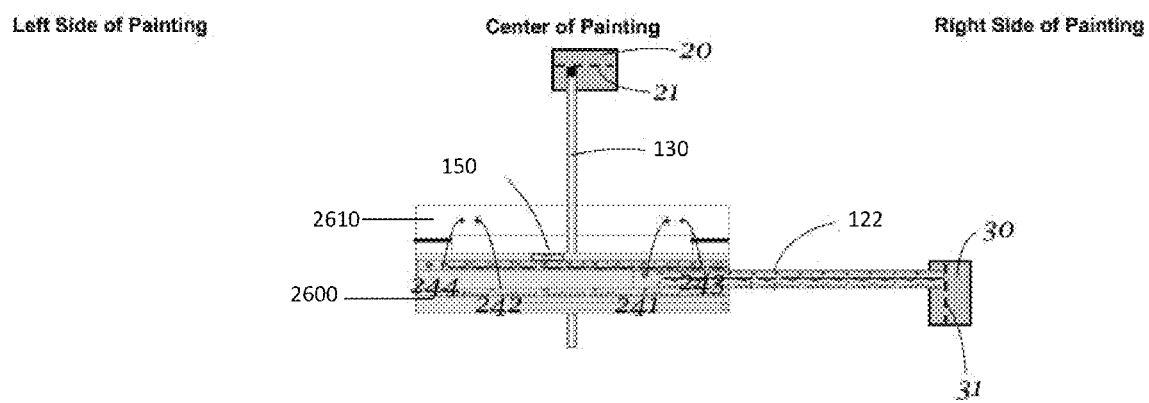
FIG. 26 depicts a RUMT/Hanger aligned on a wall, according to an embodiment.

Next, in FIG. 26 the Hanger/RUMT 2300 is removed from the back of the picture and is aligned to the horizontal 31 and vertical 21 marks on the wall or tape 20, 30 using the inner Slide 122 and the VMT 130 to guide the placement of the Hanger/RUMT 2300. The built in level 150 in the RUMT 2600 enables a level placement of the Hanger 2610. Hanger 2610 may be levelly coupled to a wall surface via orifices 241, 242, 243, and/or 244.

Figure 27:
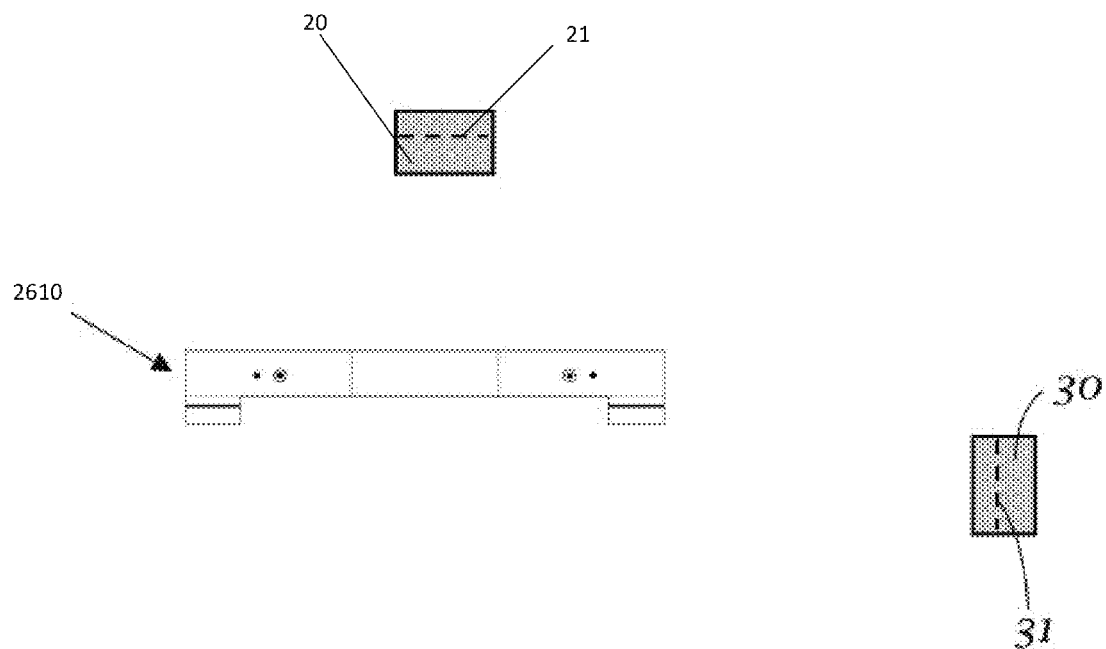
FIG. 27 depicts a hanger aligned on a wall, according to an embodiment.

FIG. 27 depicts the Hanger 2610 attached to the wall after the RUMT 2600 has been decoupled from Hanger 2610 removed. Hanger 2610 may be coupled to the wall with nails, screws, sticky material, and/or any other desired coupled mechanism that will support the picture frame on the wall.

Figure 28:
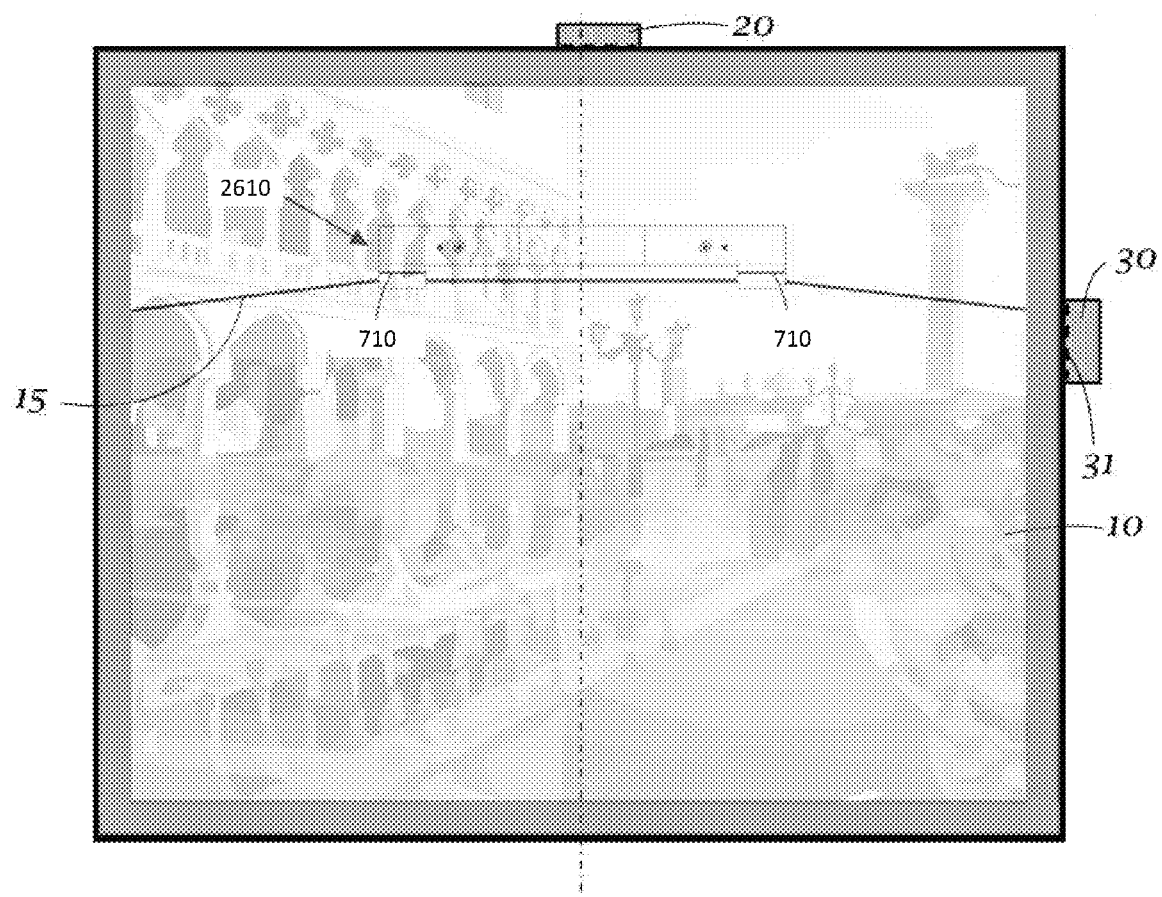
FIG. 28 depicts a frame mounted on the wall, according to an embodiment.

FIG. 28 depicts the picture frame with picture 10 hung on the Hanger 2610 with the hanger wire 15 placed in the Hanger Wire Supports 710. Additionally, the picture frame is adjusted horizontally so that its right side matches the vertical mark 31 in the horizontal direction and the horizontal mark 20 in the vertical direction. The marks can be removed cleanly from the wall by removing the sticky notes on which they were placed.

Figure 29:
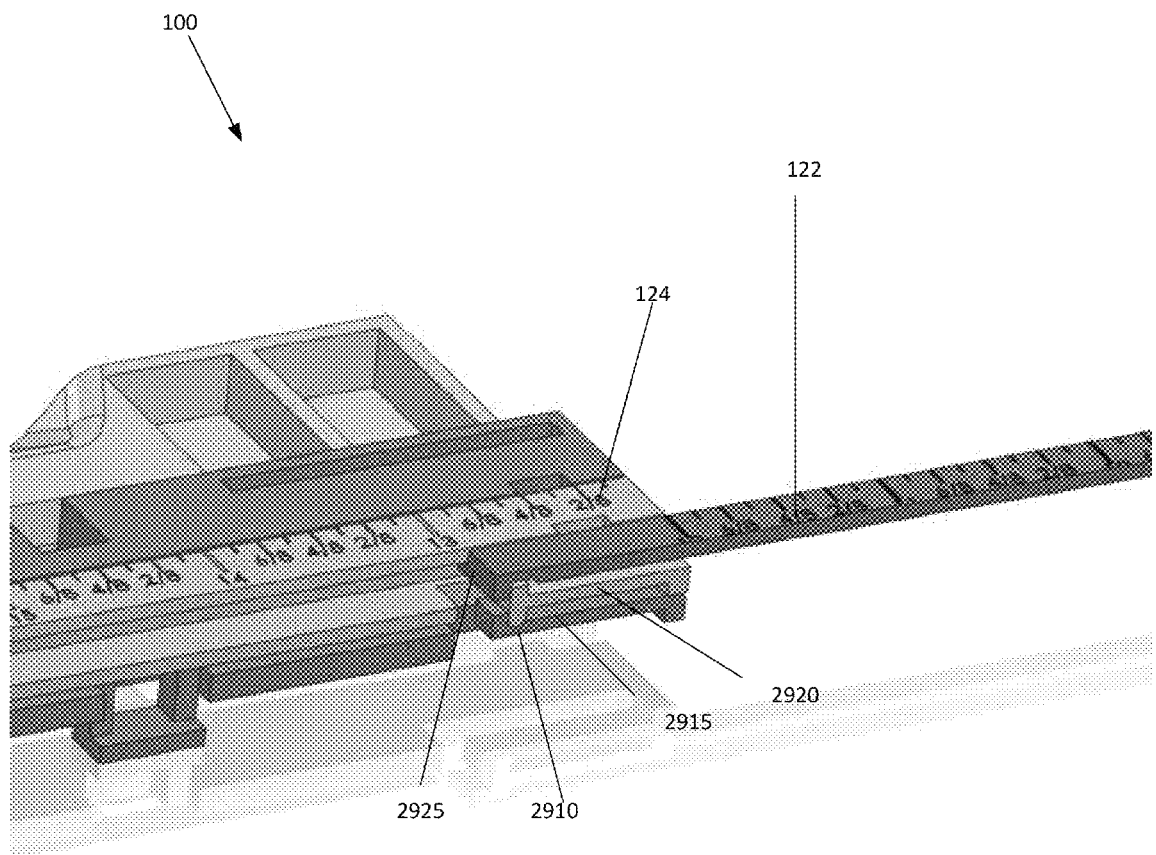
FIG. 29 depicts a cross section of the reusable measuring too, according to an embodiment.

FIG. 29 depicts a cross section of the reusable measuring tool 100. Inner Slide 122 may be extended fully to the right while the Outer Slide 124 may be aligned fully to the Left on the reusable measuring tool 100. The detent 2910 in the Tab 2915 in the reusable measuring tool 100 body engages with the Tab 2920 on the end of the Outer Slide to hold the Outer Slide in place and aligned with the reusable measuring tool. This allows the Outer Slide 124 to be held in place in the reusable measuring tool 100 while the Inner Slide 122 moves to accommodate narrower picture frames. The Stop 2925 on the back of the Inner Slide 122 buts up to the Tab 2920 on the Outer Slide 124 and limits the travel of the Inner Slide122.

Figure 30:
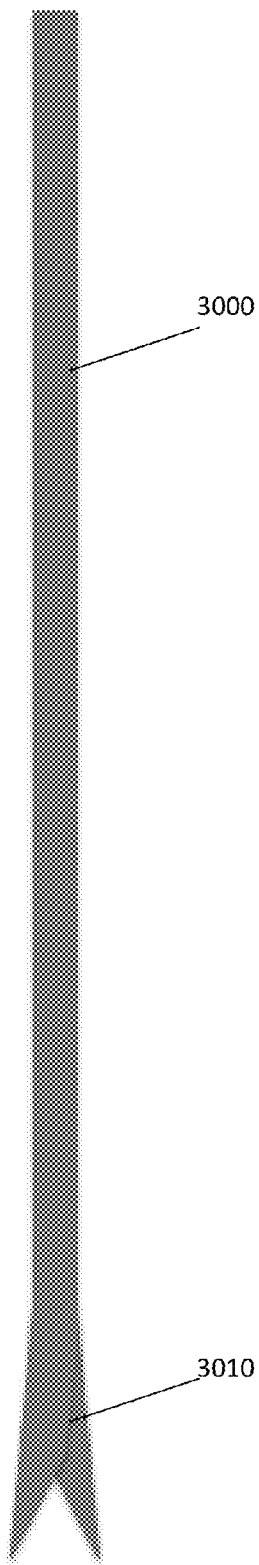
FIG. 30 depicts a vertical measuring tool that is configured to enable positioning hanger wires over the grooves in hangers, according to an embodiment.

For wider Picture Frames, the Inner Slide 122 can be extended to the right with a bit more force which will enable the Outer Slide 122 to pull past the Detent 2910 in the Tab 2915 in the reusable measuring tool 100. Thus the Inner Slide 122 will pull the Outer Slide 124 to the right to accommodate wider Picture Frames FIG. 30 depicts a vertical measuring tool 3000 that is configured to enable positioning hanger wires over the grooves in hangers, when the hangers are coupled to a wall. When the hangers are positioned on the wall and a user tries to place the hanger wires over the hangers with the frame, it may be cumbersome or awkward to position the hanger wire over the grooves in the hangers. In embodiments, one end of a vertical measuring tool may include a V shaped opened 3010 configured to enable a user to hold a frame and use the vertical measuring tool with the V shaped opening 3010 to drape the hanger wire over one hanger, and then move to the other side of the vertical measuring tool and drape the hanger wire over the second hanger within having to insert the user's arms or fingers between the frame and the hangers on the wall.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

What is claimed is:

1. A device configured to hang a frame, the device comprising:
    a reusable measuring tool including a first edge, a second edge, a stop, and a hanger opening;
    an outer slide being housed within the reusable measuring tool, the outer slide being configured to be extended away from the second edge of the reusable measuring tool;
    an inner slide being housed within the reusable measuring tool being positioned adjacent to the outer slide, the inner slide being configured to be extended away from a second edge of the outer slide, wherein the inner slide and the outer slide include a first scale positioned on an upper surface of the inner slide and the outer slide and a second scale positioned on a lower surface of the inner slide and the outer slide;
    an integrated hanger configured to be removably coupled to the reusable measuring tool, the integrated hanger including an orifice extending through the integrated hanger, when the integrated hanger is coupled with the reusable measuring tool, a first edge of the integrated hanger is positioned adjacent to the stop and a second edge of the integrated hanger is positioned adjacent to the hanger opening, wherein the stop is configured to limit the linear movement of the integrated hanger.

2. The device of claim 1, wherein at a first position, a first edge of the reusable measuring device is configured to align with a first edge of the frame, and a second edge of the inner slide is configured to align with a second edge of the frame, a first measurement on the upper scale of the inner slide determining a distance—to provide proper antecedent basis from the second edge of the reusable measuring device to the second edge of the frame, and a second measurement on the lower scale of the inner slide determine half the distance from the second edge of the reusable measuring device to the second edge of the frame.

3. The device of claim 2, wherein at a second position, the inner slide is configured to move to a position wherein a third measurement on the upper scale indicates the second measurement.

4. The device of claim 3, wherein at a third position, the second edge of the inner slide is configured to align with the second edge of the frame.

5. The device of claim 4, wherein the device further includes:
a vertical measuring tool, the vertical measuring tool being housed in a slot that extends through the reusable measuring tool from an upper surface of the reusable measuring tool to a lower surface of the reusable measuring tool.

6. The device of claim 5, wherein the integrated hanger includes a first integrated hanger and a second integrated hanger.

7. The device of claim 1, wherein the integrated hanger includes a groove, the groove being configured to receive a notch positioned on the reusable measuring tool when the integrated hanger is coupled with the reusable measuring tool, and the groove is configured to receive a wire associated with the frame when the integrated hanger is decoupled from the reusable measuring tool.

8. The device of claim 7, wherein the reusable measuring tool includes a projection on a front face of the reusable measuring tool, the projection being aligned with a positioning of the groove when the integrated hanger is coupled with the reusable measuring tool.

9. The device of claim 1, wherein a mount is configured to be positioned through the orifice in the integrated hanger securing the integrated hanger to a wall, and the reusable hanging device is configured to move in a first linear direction to align the integrated hanger with the hanger opening.

10. The device of claim 9, wherein when the integrated hanger is aligned with the hanger opening, the reusable hanging device is configured to move in a vertical direction to decouple the integrated hanger from the reusable hanging device.

* * * * *